(12) United States Patent
Kanaya et al.

(10) Patent No.: US 7,123,367 B1
(45) Date of Patent: Oct. 17, 2006

(54) PRINTING APPARATUS

(75) Inventors: Munehide Kanaya, Nagano-ken (JP); Toyohiko Mitsuzawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/539,325

(22) Filed: Mar. 30, 2000

Related U.S. Application Data

(63) Continuation-in-part of application No. PCT/JP99/04689, filed on Aug. 30, 1999.

(30) Foreign Application Priority Data

| | | |
|---|---|---|
| Aug. 31, 1998 | (JP) | 10-260837 |
| Aug. 31, 1998 | (JP) | 10-260838 |
| Mar. 30, 1999 | (JP) | 11-087906 |

(51) Int. Cl.
    B41B 1/00    (2006.01)
    G06F 15/00   (2006.01)

(52) U.S. Cl. .................. 358/1.13; 347/19

(58) Field of Classification Search ....... 358/1.11–1.16, 358/1.18, 1.9, 1.1; 347/37, 40, 5, 19, 15
See application file for complete search history.

(56) References Cited

U.S. PATENT DOCUMENTS

| | | | |
|---|---|---|---|
| 5,049,898 A | | 9/1991 | Arthur et al. |
| 5,946,011 A | | 8/1999 | Kanaya |
| 6,356,358 B1 | * | 3/2002 | Kakutani et al. ............ 358/1.7 |
| 6,574,002 B1 | * | 6/2003 | Paczewitz ................. 358/1.13 |
| 2001/0030757 A1 | * | 10/2001 | Sumiuchi et al. ........... 358/1.9 |

FOREIGN PATENT DOCUMENTS

| | | | |
|---|---|---|---|
| EP | 867800 A2 | * | 9/1998 |
| JP | 2-167755 | | 6/1990 |
| JP | 2-279344 | | 11/1990 |
| JP | 08-290562 A | | 11/1996 |
| JP | 9-314828 | | 12/1997 |
| JP | 10-337864 | | 12/1998 |
| JP | 11-10853 A | | 1/1999 |
| JP | 2000-141630 | | 5/2000 |
| WO | WO 98/45119 | | 10/1998 |
| WO | WO 9845119 A1 | * | 10/1998 |

* cited by examiner

Primary Examiner—Twyler M. Lamb
Assistant Examiner—Thierry L. Pham
(74) Attorney, Agent, or Firm—Oblon, Spivak, McClelland, Maier & Neustadt, P.C.

(57) ABSTRACT

There is provided a plurality of dot printing modes each defining printing operations during main- and sub-scanning. A preferable dot printing mode is selected according to mode selection information that is predetermined to specify the preferable printing mode, and printing is executed according to the preferable dot printing mode specified by the mode selection information. The plurality of dot printing modes are divided into a plurality of printing mode groups according to combination of print resolution and printing speed. The mode selection information specifies the preferable dot printing mode for each printing mode group. One of the plurality of printing mode groups is selected in initial settings of the printing apparatus.

8 Claims, 18 Drawing Sheets

DRIVE VOLTAGE INFORMATION VH1~VH3

| Symbol | Voltage |
|---|---|
| A | 15V |
| B | 16V |
| S | 24V |

ACTUATOR RANK INFORMATION AR

| Symbol | Rank |
|---|---|
| Z | 0 |
| 1 | 1 |
| 2 | 2 |

INK EMISSION AMOUNT INFORMATION IW1,IW2

| Symbol | Weight ratio |
|---|---|
| A | 79~81 |
| B | 81~83 |
| L | 99~101 |

PRINTING MODE INFORMATION RM

| Symbol | High quality mode | High speed mode |
|---|---|---|
| 1 | Mode 1 | Mode 11 |
| 2 | Mode 2 | Mode 12 |
| 4 | Mode 1 | Mode 14 |

DRIVE SIGNAL FOR FIXED DOT QUANTITY PRINTING

SUB-SCAN FEED

PARAMETERS

Nozzle pitch k : 3[dots]
No. of working nozzles N : 4
No. of scan repeats s : 2
No. of effective nozzles Neff : 2

| No. of feeds | 0 | 1 | 2 | 3 | 4 | 5 | 6 |
|---|---|---|---|---|---|---|---|
| Feed L [dots] | 0 | 2 | 2 | 2 | 2 | 2 | 2 |
| ΣL | 0 | 2 | 4 | 6 | 8 | 10 | 12 |
| F = (ΣL)%k | 0 | 2 | 1 | 0 | 2 | 1 | 0 |

Fig.15(A)

SCANNING PARAMETERS OF FIRST DOT PRINTING MODE
    Nozzle pitch k          : 6 [dots], No. of scan repeats s   : 2
    No. of working nozzles N : 48      , No. of effective nozzles  Neff : 24

| No. of feeds | 0 | 1 | 2 | 3 | 4 | 5 | 6 |
|---|---|---|---|---|---|---|---|
| Feed L [dots] | 0 | 20 | 27 | 22 | 28 | 21 | 26 |
| ΣL | 0 | 20 | 47 | 69 | 97 | 118 | 144 |
| F=(ΣL)%k | 0 | 2 | 5 | 3 | 1 | 4 | 0 |

Fig.15(B)

SCANNING PARAMETERS OF SECOND DOT PRINTING MODE
    Nozzle pitch k          : 6 [dots], No. of scan repeats s   : 2
    No. of working nozzles N : 48      , No. of effective nozzles  Neff : 24

| No. of feeds | 0 | 1 | 2 | 3 | 4 | 5 | 6 |
|---|---|---|---|---|---|---|---|
| Feed L [dots] | 0 | 27 | 26 | 20 | 21 | 22 | 28 |
| ΣL | 0 | 27 | 53 | 73 | 94 | 116 | 144 |
| F=(ΣL)%k | 0 | 3 | 5 | 1 | 4 | 2 | 0 |

Fig.15(C)

SCANNING PARAMETERS OF THIRD DOT PRINTING MODE
    Nozzle pitch k          : 6 [dots], No. of scan repeats s   : 2
    No. of working nozzles N : 47      , No. of effective nozzles  Neff : 23.5

| No. of feeds | 0 | 1 | 2 | 3 | 4 | 5 | 6 |
|---|---|---|---|---|---|---|---|
| Feed L [dots] | 0 | 21 | 26 | 21 | 26 | 21 | 26 |
| ΣL | 0 | 21 | 47 | 68 | 94 | 115 | 141 |
| F=(ΣL)%k | 0 | 3 | 5 | 2 | 4 | 1 | 3 |
| No. of feeds |  | 7 | 8 | 9 | 10 | 11 | 12 |
| Feed L [dots] |  | 21 | 26 | 21 | 26 | 21 | 26 |
| ΣL |  | 162 | 188 | 209 | 235 | 256 | 282 |
| F=(ΣL)%k |  | 0 | 2 | 5 | 1 | 4 | 0 |

Fig.15(D)

SCANNING PARAMETERS OF FOURTH DOT PRINTING MODE
    Nozzle pitch k          : 6 [dots], No. of scan repeats s   : 2
    No. of working nozzles N : 47      , No. of effective nozzles  Neff : 23.5

| No. of feeds | 0 | 1 | 2 | 3 | 4 | 5 | 6 |
|---|---|---|---|---|---|---|---|
| Feed L [dots] | 0 | 15 | 32 | 15 | 32 | 15 | 32 |
| ΣL | 0 | 15 | 47 | 62 | 94 | 109 | 141 |
| F=(ΣL)%k | 0 | 3 | 5 | 2 | 4 | 1 | 3 |
| No. of feeds |  | 7 | 8 | 9 | 10 | 11 | 12 |
| Feed L [dots] |  | 15 | 32 | 15 | 32 | 15 | 32 |
| ΣL |  | 156 | 188 | 203 | 235 | 250 | 282 |
| F=(ΣL)%k |  | 0 | 2 | 5 | 1 | 4 | 0 |

Fig. 20(A)

SCANNING PARAMETERS OF FIRST DOT PRINTING MODE OF MODE GROUP M4

Nozzle pitch k : 6 [dots], No. of scan repeats s : 2
No. of working nozzles N : 48 , No. of effective nozzles Neff : 24

| No. of feeds | 0 | 1 | 2 | 3 | 4 | 5 | 6 |
|---|---|---|---|---|---|---|---|
| Feed L [dots] | 0 | 20 | 27 | 22 | 28 | 21 | 26 |
| $\Sigma L$ | 0 | 20 | 47 | 69 | 97 | 118 | 144 |
| $F = (\Sigma L)\%k$ | 0 | 2 | 5 | 3 | 1 | 4 | 0 |

Fig. 20(B)

SCANNING PARAMETERS OF SECOND DOT PRINTING MODE OF MODE GROUP M4

Nozzle pitch k : 6 [dots], No. of scan repeats s : 2
No. of working nozzles N : 48 , No. of effective nozzles Neff : 24

| No. of feeds | 0 | 1 | 2 | 3 | 4 | 5 | 6 |
|---|---|---|---|---|---|---|---|
| Feed L [dots] | 0 | 27 | 26 | 20 | 21 | 22 | 28 |
| $\Sigma L$ | 0 | 27 | 53 | 73 | 94 | 116 | 144 |
| $F = (\Sigma L)\%k$ | 0 | 3 | 5 | 1 | 4 | 2 | 0 |

Fig. 20(C)

SCANNING PARAMETERS OF THIRD DOT PRINTING MODE OF MODE GROUP M4

Nozzle pitch k : 6 [dots], No. of scan repeats s : 2
No. of working nozzles N : 47 , No. of effective nozzles Neff : 23.5

| No. of feeds | 0 | 1 | 2 | 3 | 4 | 5 | 6 |
|---|---|---|---|---|---|---|---|
| Feed L [dots] | 0 | 21 | 26 | 21 | 26 | 21 | 26 |
| $\Sigma L$ | 0 | 21 | 47 | 68 | 94 | 115 | 141 |
| $F = (\Sigma L)\%k$ | 0 | 3 | 5 | 2 | 4 | 1 | 3 |
| No. of feeds |  | 7 | 8 | 9 | 10 | 11 | 12 |
| Feed L [dots] |  | 21 | 26 | 21 | 26 | 21 | 26 |
| $\Sigma L$ |  | 162 | 188 | 209 | 235 | 256 | 282 |
| $F = (\Sigma L)\%k$ |  | 0 | 2 | 5 | 1 | 4 | 0 |

Fig. 21(A)

CONTENTS OF PRINTING MODE TABLE 206

| Resolution | Mode Group | Mode ID | No. of nozzles N | Feed L |
|---|---|---|---|---|
| 360dpi | Fast M1 | 1 | Na1 | La1 |
| | Fine (Slow) M2 | 1 | Nb1 | Lb1 |
| | | 2 | Nb2 | Lb2 |
| 720dpi | Fast M3 | 1 | Nc1 | Lc1 |
| | Fine (Slow) M4 | 1 | Nd1 | Ld1 |
| | | 2 | Nd2 | Ld2 |
| | | 3 | Nd3 | Ld3 |

$Na1/s > Nb1/s \approx Nb2/s$ $Nc1/s > Nd1/s \approx Nd2/s \approx Nd3/s$

Fig. 21(B)

SETTINGS IN MODE ID MEMORY 202

| M1 | M2 | M3 | M4 |
|---|---|---|---|
| 1 | 2 | 1 | 3 |

Printer initial setting

Fig. 22

PRINTING MODE GROUP SELECTED FOR EACH PRINT MEDIUM AT INITIAL SETTINGS

| Resolution | Mode Group | | Mode ID | No. of nozzles N | Feed L | Plain paper | | Superfine paper | | Photo-print paper | |
|---|---|---|---|---|---|---|---|---|---|---|---|
| | | | | | | Fast | Fine | Fast | Fine | Fast | Fine |
| 360dpi | Fast | M1 | 1 | Na1 | La1 | ○ | | | | | |
| | Fine (Slow) | M2 | 1 | Nb1 | Lb1 | | | | | | |
| | | | 2 | Nb2 | Lb2 | | | | | | |
| 720dpi | Fast | M3 | 1 | Nc1 | Lc1 | | | ○ | | ○ | |
| | Fine (Slow) | M4 | 1 | Nd1 | Ld1 | | | | | | |
| | | | 2 | Nd2 | Ld2 | | | | | | |
| | | | 3 | Nd3 | Ld3 | | ○ | | ○ | | ○ |
| | | | | | | M1=1 | M4=3 | M3=1 | M4=3 | M3=1 | M4=3 |

⇧ Plain paper initial setting
⇧ Printer initial setting
⇧ Superfine paper initial setting
⇧ Photo-print paper initial setting

PRINTING APPARATUS

This application is a Continuation-in-part (CIP) of application PCT Appln. No. JP99/04689 Filed on Aug. 30, 1999.

FIELD OF THE INVENTION

The present invention relates to a printer for printing dots on a printing media.

BACKGROUND ART

Normally printers are provided with a print head unit to effect the printing. In order to obtain good quality printing it is preferable for the various printing processing parameters, such as the head drive voltage, for example, to be adjusted to match the characteristics of the print head unit.

However, the characteristics of a print head unit and other characteristics of a printer vary according to the manufacturing history of the printer concerned. Thus, to achieve good quality printing with each printer, there has been a need for a technology that enables such good quality printing to be attained by setting printing processing parameters that are appropriate to the characteristics of each individual printer.

SUMMARY OF THE INVENTION

Accordingly, an object of the present invention is to provide a technology that enables good quality printing to be attained in accordance with the individual characteristics of each printer.

In order to attain at least part of the above and other objects of the present invention, there is provided a plurality of dot printing modes each defining printing operations during main- and sub-scanning. A preferable dot printing mode is selected according to mode selection information that is predetermined to specify the preferable printing mode, and printing is executed according to the preferable dot printing mode specified by the mode selection information. The plurality of dot printing modes are divided into a plurality of printing mode groups according to combination of print resolution and printing speed. The mode selection information specifies the preferable dot printing mode for each printing mode group. One of the plurality of printing mode groups is selected in initial settings of the printing apparatus.

With respect to each individual such printer, a preferable dot printing mode may be selected from the plurality of dot printing modes according to mode selection information specifying the preferable dot printing mode. This makes it possible to use the preferable dot printing mode that is best suited for each printer. Moreover, one of the plurality of printing mode groups is selected in the initial settings of the printing apparatus, so when the initial settings are not changed by a user, a desirable printing operation can be effected in accordance with the preferable dot printing mode of the printing mode group selected in the initial settings of the printing apparatus.

In a preferred embodiment, an initial setting is provided for each print medium type of different surface quality where one printing mode group is selected by each initial setting for each print medium type, and the initial setting relating to a predetermined print medium type is pre-selected as an initial setting of the printing apparatus.

In the initial settings state, the above arrangement makes it possible to use a dot printing mode that is the preferable mode for the surface quality of the print medium.

Among the plurality of printing mode groups, two or more printing mode groups with respect to one print resolution may be arranged so that the number of dot printing modes included in a group increases as its printing speed decreases.

For the same printing resolution, at relatively lower printing speeds the difference in quality between dot printing modes tends to become quite large. Accordingly, the arrangement that the number of dot printing modes included in a group increases as its printing speed decreases makes it easier to achieve higher image quality at relatively low printing speeds.

BRIEF DESCRIPTION OF THE DRAWINGS

FIGS. 15(A)–15(D) show the scanning parameters used for printing in each of four dot printing modes at substantially the same printing speed.

FIGS. 20(A)–20(C) show the scanning parameters used in the third embodiment for printing in each of four dot printing modes at substantially the same printing speed.

FIGS. 21(A) and 21(B) show the contents of the printing mode table and mode ID memory used in the third embodiment.

FIG. 22 shows the printing mode group selected in the initial settings for each type of paper.

DESCRIPTION OF THE PREFERRED EMBODIMENT

A. Configuration of Apparatus

Figure 1:
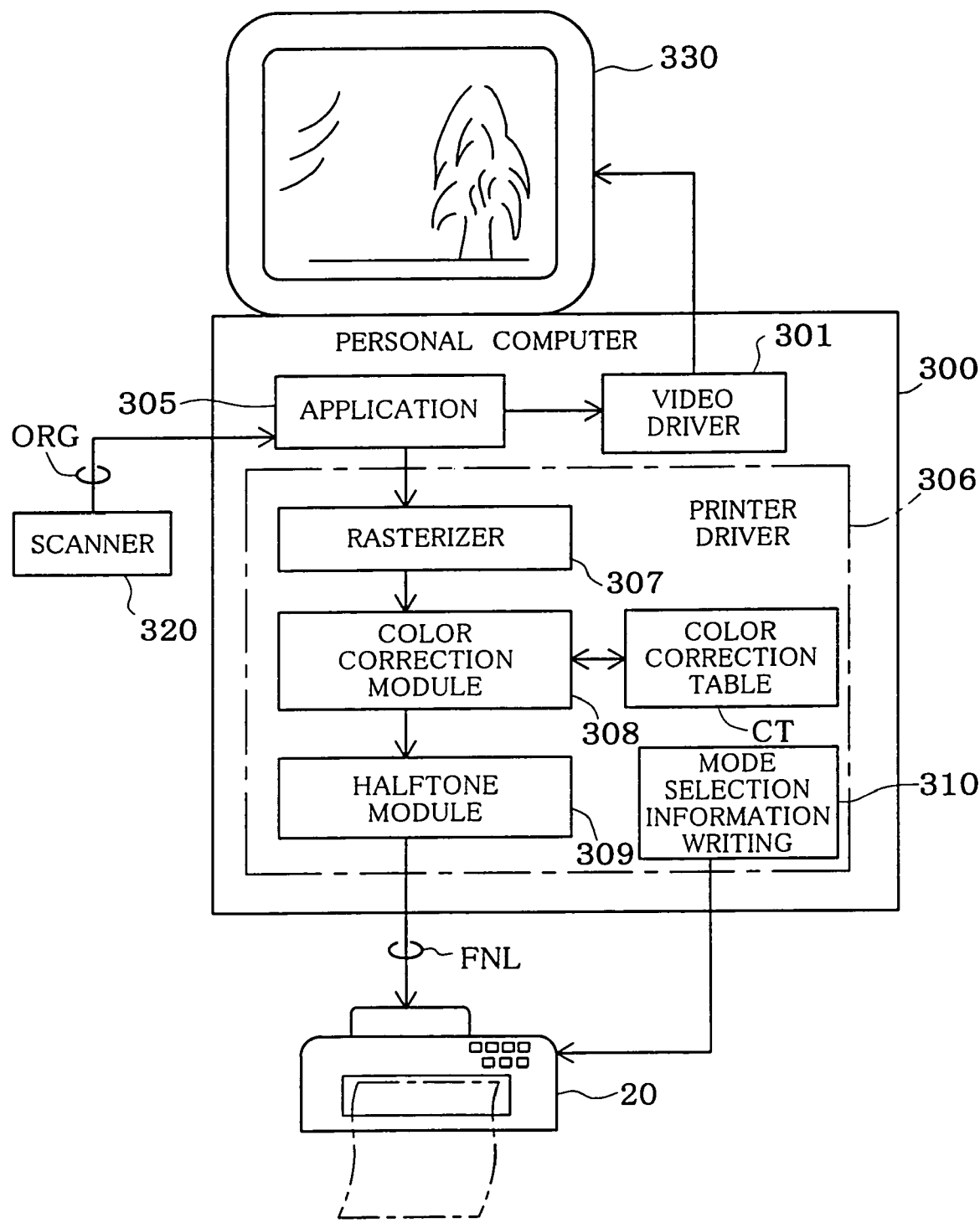
FIG. 1 is a block diagram of the general configuration of the image processing system of the invention.

FIG. 1 is a block diagram showing the configuration of a color image processing system that is an embodiment of the present invention. The color image processing system has a scanner 320, a personal computer 300 and a color printer 20. The personal computer 300 has a color display 330. The scanner 320 reads color image data from a color original and supplies to the personal computer 300 basic color image data ORG comprised of three color components red (R), green (G) and blue (B).

The personal computer 300 contains components (not shown) such as CPU, RAM and ROM and runs an application program 305 under a prescribed operating system. The operating system incorporates a video driver 301 and a printer driver 306. By means of these drivers, the application program 305 outputs final color image data FNL. The application program 305, which is used to retouch images and so forth, subjects the image from the scanner to prescribed processing while using the video driver 301 to display the image on a CRT display 330. When the application program 305 issues an instruction to print, the printer driver 306 receives the image information from the application program 305 and converts the image information to signals (in this case, binarized signals for each of the colors cyan (C), magenta (M), yellow (Y) and black (K)) that enable the printer 20 to print the image. In the example of FIG. 1, the printer driver 306 includes a rasterizer 307 that converts the color image data handled by the application program 305 to dot unit image data, a color correction module 308 that performs color correction of the dot unit image data in accordance with the cyan, magenta and yellow inks used by the printer 20, a color correction table CT used by the color correction module 308, a halftone module 309 that generates, from the color corrected image information, halftone image information expressing a density for a given area in accordance with the presence or absence of ink on each dot, and a mode selection information writing module 310 for writing the mode selection information described below into a memory in the printer 20.

Figure 2:
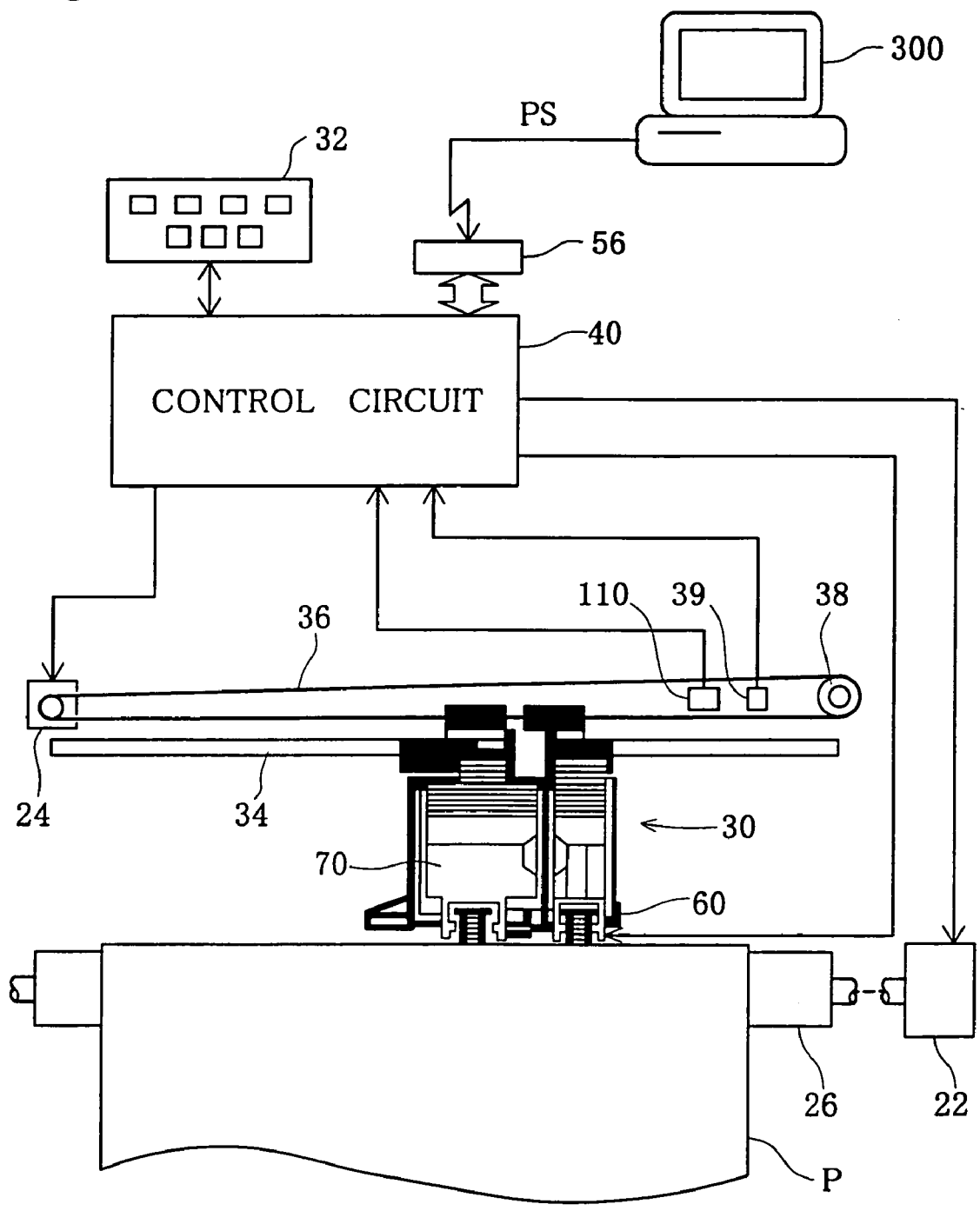
FIG. 2 shows the general configuration of a printer 20 according to an embodiment of the invention.

FIG. 2 shows the general configuration of the printer 20. The printer 20 includes a mechanism driven by a paper feed motor 22 to transport paper P, a mechanism driven by a carriage motor 24 to effect reciprocating movement of a carriage 30 axially along a platen 26, a mechanism for driving a print head unit 60 (also referred to as a print head assembly) mounted on the carriage 30 to control ink emission and dot formation, and a control circuit 40 that controls signals moving between a control panel 32 and the feed motor 22, the carriage motor 24 and the print head unit 60. The control circuit 40 is connected to a computer 88 via a connector 56.

The paper transport mechanism includes a gear-train (not shown) that transmits the rotation of the feed motor 22 to the platen 26 and to paper transport rollers (not shown). The mechanism for reciprocating the carriage 30 includes a slide-shaft 34 that slidably supports the carriage 30 and is disposed parallel to the axis of the platen 26, a pulley 38 connected to the carriage motor 24 by an endless drive belt 36, and a position sensor 39 for detecting the starting position of the carriage 30.

Figure 3:
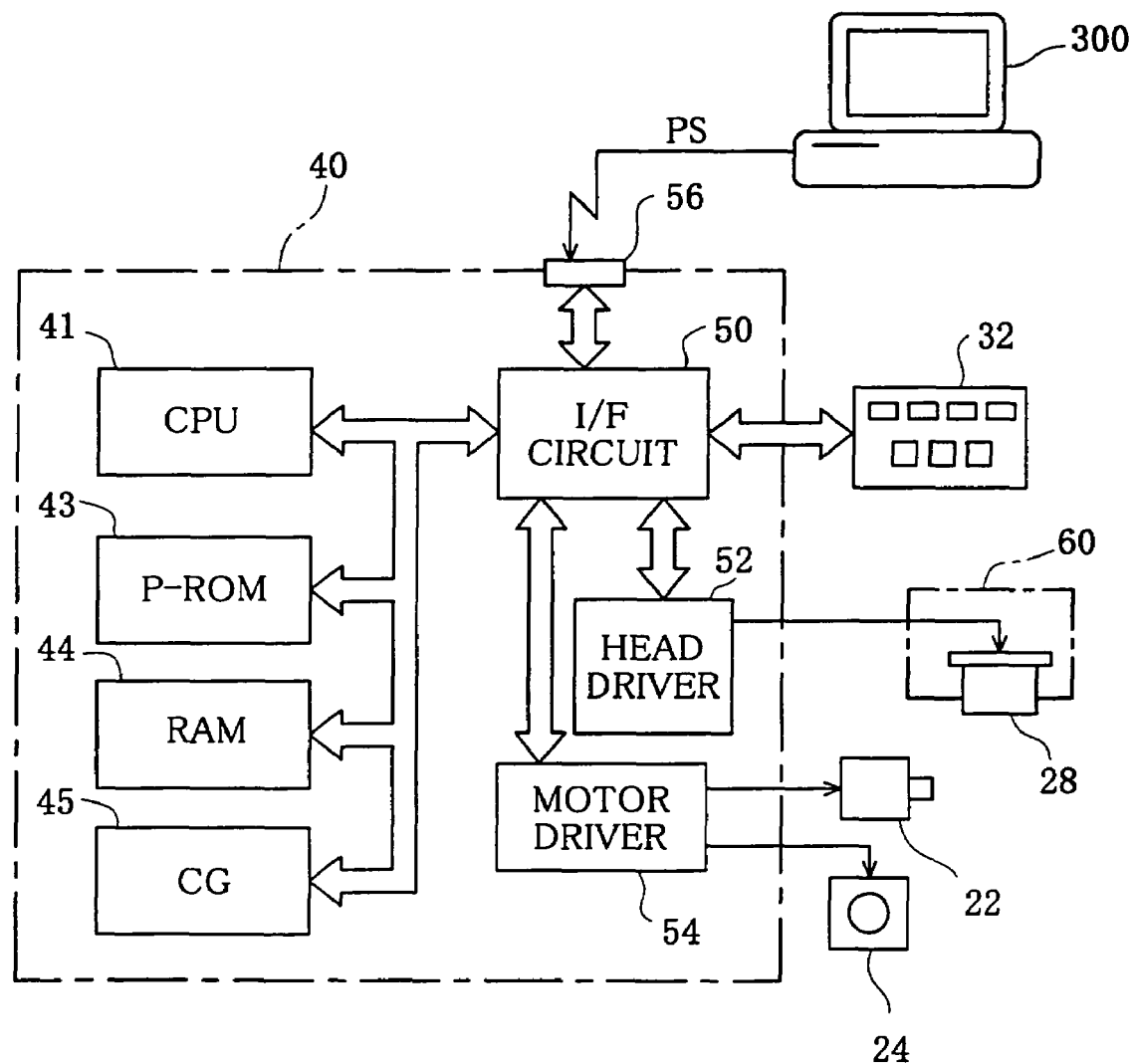
FIG. 3 is a block diagram showing the configuration of the control circuit 40 of the printer 20.

FIG. 3 shows the configuration of the control circuit 40 comprising the heart of the printer 20. The control circuit 40 is configured as an arithmetical logic processing circuit that includes a CPU 41, a programmable ROM (PROM) 43, RAM 44 and a character generator (CG) 45 in which is stored a character dot matrix. The control circuit 40 is also provided with an interface (I/F) circuit 50 for interfacing with an external motor and the like, a head drive circuit 52 that is connected to the I/F circuit 50 and drives the print head unit 60, and a motor drive circuit 54 that drives the feed motor 22 and the carriage motor 24. The I/F circuit 50 incorporates a parallel interface circuit and can receive print signals PS from the computer 88 via the connector 56.

Figure 4:
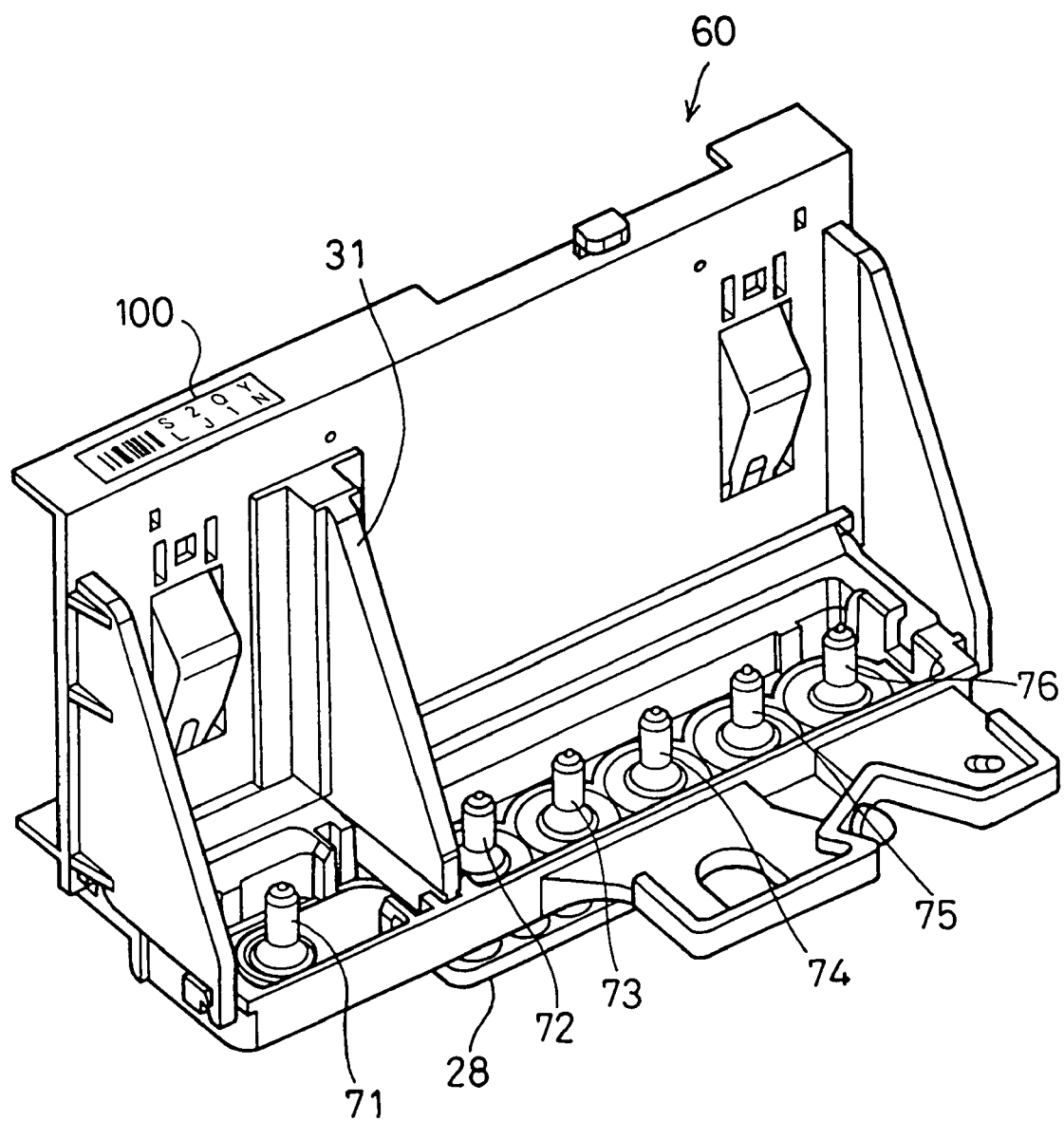
FIG. 4 is a perspective view of the print head unit 60.

The specific configuration of the print head unit 60 and the working principle by which ink is emitted will be described. As shown in FIG. 4, the print head unit 60 is an L-shaped unit able to hold black and color ink cartridges (not shown). The print head unit 60 is provided with a divider plate 31 that allows both cartridges to be installed.

An ID seal 100 is provided on the top edge of the print head unit 60. The ID seal 100 displays head identification information relating to the print head unit 60. Details of the information provided by the ID seal 100 are described later.

The bottom part of the print head unit 60 is provided with ink channels 71–76 via which ink is supplied from ink tanks to the print head 28 (described below). When black and color ink cartridges are installed by being pressed down into the print head unit 60, the ink channels 71–76 are inserted into the respective cartridges.

Figure 5:
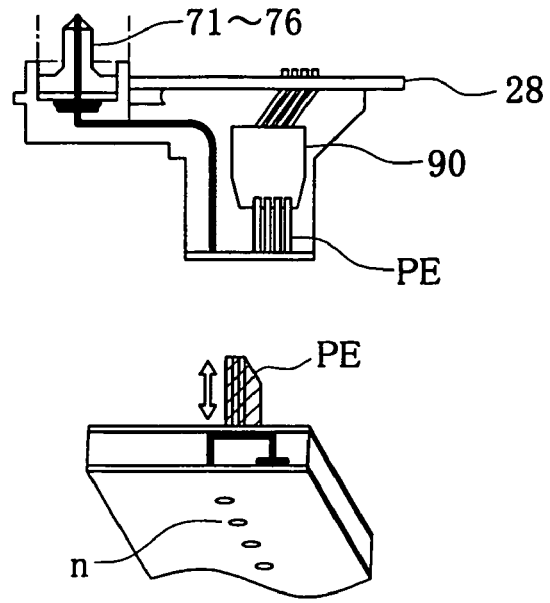
FIG. 5 shows the ink emission structure of the print heads.

The ink emission mechanism will now be briefly explained. When an ink cartridge is installed on the print head unit 60, ink from the cartridge is drawn out via the ink channels 71–76 and channeled to the print head 28 provided on the underside of the print head unit 60, as shown in FIG. 5.

The print head 28 has a plurality of nozzles n arranged in a line for each color, a piezoelectric element PE provided for each nozzle n, and an actuator circuit 90 for operating the piezoelectric element PE in accordance with drive signals from the head drive circuit 52 (FIG. 3). The head drive circuit 52 generates a common drive signal applied in common to all nozzles and transmits the signals to the print head 28. In accordance with a print signal PS supplied from the computer 88 for each nozzle, the actuator circuit 90 is latched on (ink is emitted) or off (ink is not emitted), and applies a drive signal to piezoelectric elements PE only in respect of nozzles that are switched on. Applying an electric charge to a piezoelectric element creates stress in the crystalline structure, which is used to obtain high-speed conversion of electrical to mechanical energy. The term "actuator" is used to refer collectively to the piezoelectric element PE and the actuator circuit 90.

Figure 6A:
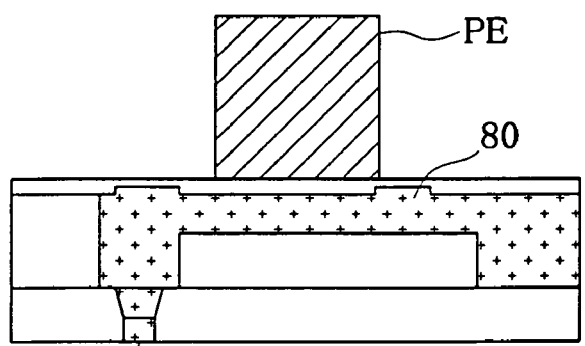
FIGS. 6(A) and 6(B) show how ink particles Ip are emitted by the expansion of a piezoelectric element PE.
Figure 6B:
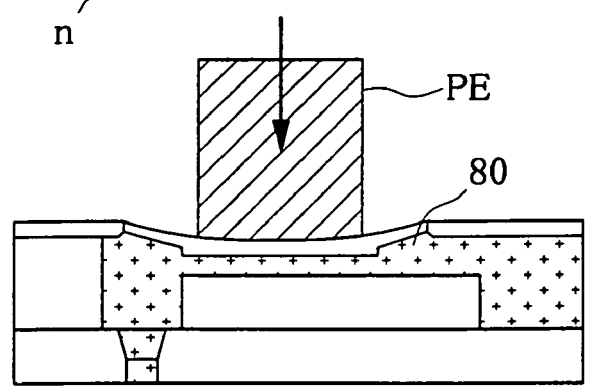

FIGS. 6(A) and 6(B) show structural details of the piezoelectric element PE and a nozzle n. The piezoelectric element PE is provided in contact with an ink passage 80 through which ink flows to the nozzle n. In this embodiment, when a voltage of prescribed duration is applied across the electrodes of the piezoelectric element PE, the piezoelectric element PE rapidly expands, deforming a wall of the ink channel 80, as shown in FIG. 6(B). This reduces the volume of the ink channel 80 by an amount corresponding to the expansion of the piezoelectric element PE, thereby expelling a corresponding amount of ink in the form of an ink particle Ip that is emitted at a high speed from the nozzle n. Printing is effected by these ink particles Ip impacting the paper P on the platen 26.

Figure 7:
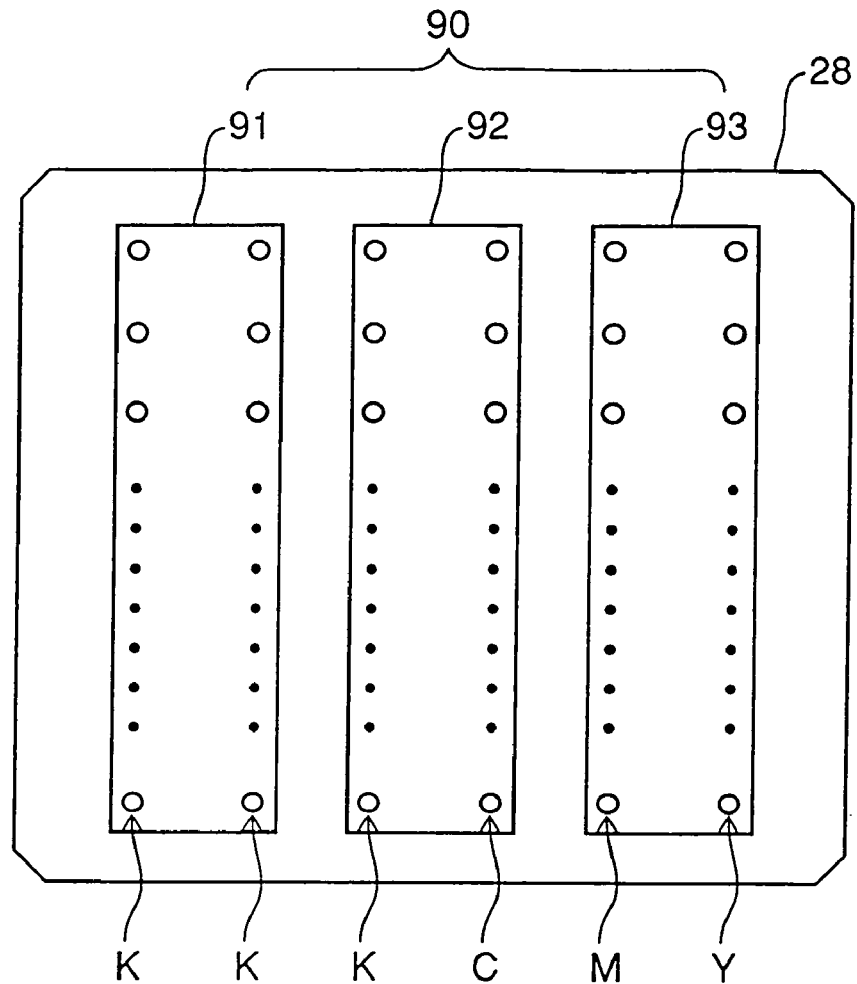
FIG. 7 shows the positional correspondence between the rows of nozzles in the print head 28 and the actuator circuits.
Figure 8:
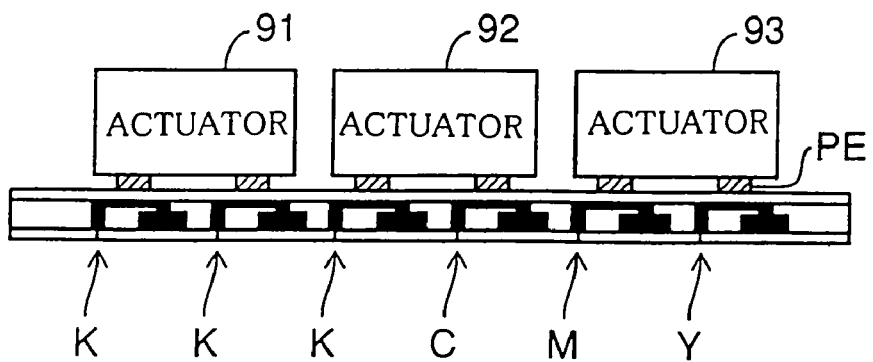
FIG. 8 shows the positional correspondence between the rows of nozzles in the print head 28 and the actuator circuits.

FIGS. 7 and 8 show the positional relationship between the rows of nozzles and the actuator sets in the print head 28. This printer 20 prints using ink of the four colors black (K), cyan (C), magenta (M) and yellow (Y). To increase the speed of monochrome printing, there are three rows of nozzles for black ink. For each of the other three colors, there is one row of nozzles. The actuator circuit 90 comprises a first actuator chip 91 for emitting ink from two black ink nozzles, a second actuator chip 92 for emitting ink from a row of black ink nozzles and a row of cyan ink nozzles, and a third actuator chip 93 for emitting ink from a row of magenta ink nozzles and a row of yellow ink nozzles. Monochrome printing is effected using just the two rows of black ink nozzles of the first actuator chip 91. During color printing, the nozzles of all three actuator chips are used to effect printing in the four colors.

The reason why the component 60 shown in FIG. 4 comprising the print head 28 and the ink cartridge holders is called "print head unit" is because it is removably installed in the inkjet printer 20 as a single component. Thus, when a print head 28 is to be replaced, it is the print head unit 60 itself that is replaced.

The PROM 43 in the control circuit 40 (FIG. 3) contains dot printing mode information that includes the parameters for a plurality of dot printing modes. Here, "dot printing mode" means a mode for printing dots prescribed by the number of nozzles in a row that are actually used, the sub-scanning feed amount, and so forth. Herein, "printing method," "printing mode" and "print mode" are used substantially interchangeably. Specific examples of dot printing modes and the related parameters are described later. Mode selection information for selection a preferable mode from among the plurality of dot printing modes is also stored in the PROM 43.

Also as explained later herein, the dot printing modes are divided into a plurality of printing mode groups by print resolution and printing speed, with each of the printing mode groups including at least one dot printing mode. In each printing mode group, a mode that enables the highest quality images to be printed is selected as a preferable dot printing mode. The quality of the images printed in each dot printing mode depends on the alignment characteristics of the nozzles in the print head 28 (the actual position of each nozzle). For example, there are cases in which there are two nozzles in an array that deviate from the design position away from each other (or towards each other). When the two nozzles are used to print two adjacent raster lines, "banding" or a streak of degraded image portion is produced between the raster lines. The combination of nozzles to be used to form adjacent raster lines is determined in accordance with the dot printing mode (especially the sub-scanning feed amount). Consequently, what is the preferable dot printing mode depends on the characteristics of the print head 28 (the actual position of each nozzle) used in the printer. Since the dot printing mode specified by the mode selection information is determined by the characteristics of the print head 28, the mode selection information can be thought of as an identifier denoting the type of print head 28. Thus, herein the mode selection information is also referred to as "head ID" or "mode ID."

When the printer driver 306 is installed during boot-up of the computer 300, the dot printing mode information is retrieved from the PROM 43 by the printer driver 306. Thus, the dot printing mode information relating to the preferable dot printing mode specified by the mode selection information is read in from the PROM 43 by the printer driver 306. Processing by the rasterizer 307 and halftone module 309 and main and sub scanning operations are executed on the basis of this dot printing mode information.

The PROM 43 may be formed using any non-volatile rewritable memory, such as for example EEPROM or flash memory. While it is preferable for the mode selection information to be stored in a rewritable non-volatile memory, it can be stored in a ROM. Similarly, the plurality of dot printing mode information may be stored in a storage means other than PROM 43, or may be registered in the printer driver 306.

B. First Embodiment:

In the first embodiment of the invention described below, a head ID seal 100 (FIG. 4) that has been adhered beforehand to the print head unit 60 is used to set the preferable dot printing mode.

FIG. 9 shows details of the head identification information displayed on the head ID seal 100. A barcode 102 and ID symbols 104 are printed on the head ID seal 100. The eight symbols S, 2, Q, Y, L, J, 1, N are the prescribed ID symbols 104. The barcode 102 represents the same eight ID symbols. From the upper left, the eight symbols denote: first drive voltage information VH1, actuator rank information AR, second drive voltage information VH2, third drive voltage information VH3, first ink emission amount information IW1, second ink emission amount information IW2, and checksum data CID. Checksum data CID is used to check whether there is an error in the other seven information items.

The drive voltages VH1–VH3 and the actuator rank information AR are associated with the waveform of the common drive signal generated by the head drive circuit 52. The printer 20 of this embodiment can perform fixed dot quantity printing using dots of a fixed size, and variable dot quantity printing using dots of three sizes. The waveform of the common drive signal used during fixed dot quantity printing is not the same as the waveform of the common drive signal used during variable dot quantity printing. First, the common drive signal waveform will be explained.

Figure 10:
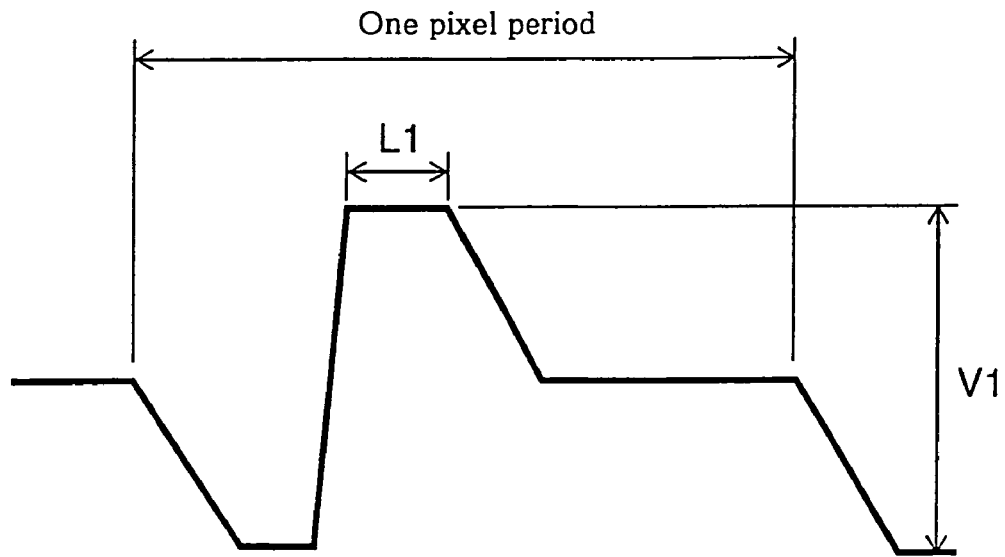
FIG. 10 shows a drive signal waveform for fixed dot quantity printing.
Figure 11:
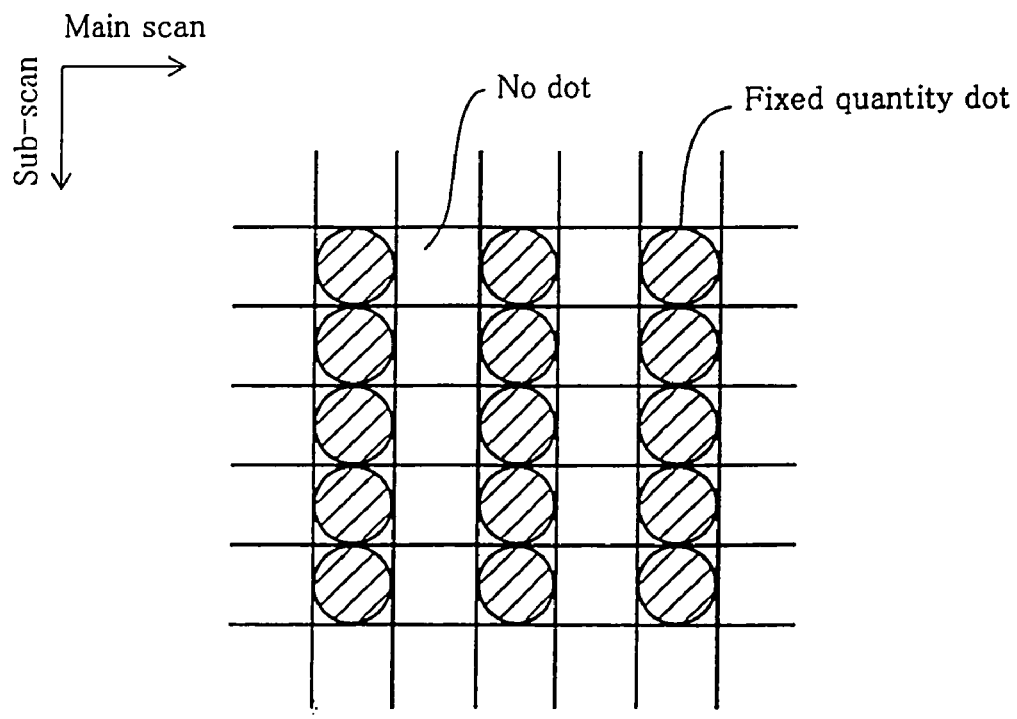
FIG. 11 shows an example of fixed dot quantity printing.

FIG. 10 is a common drive signal waveform for fixed dot quantity printing, and FIG. 11 shows an example of fixed dot quantity printing printed using this common drive signal waveform. Each square of the matrix corresponds to the area of one pixel. In the example shown in FIG. 11, the fixed quantity dot is printed on every other pixel in the main scanning direction.

Figure 12:
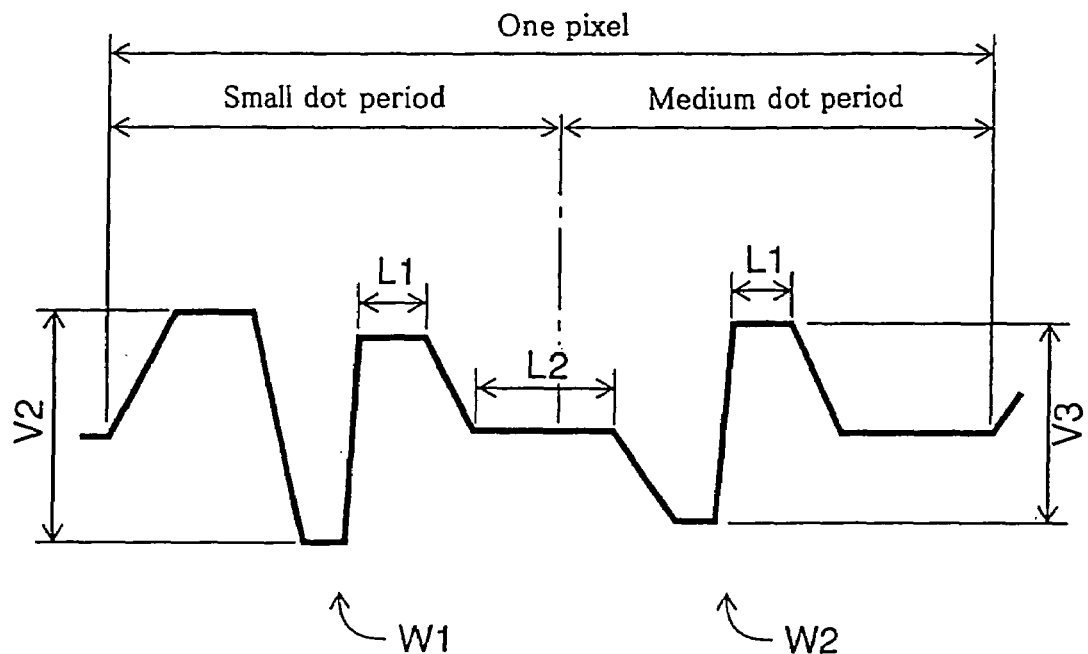
FIG. 12 shows a drive signal waveform for variable dot quantity printing.
Figure 13:
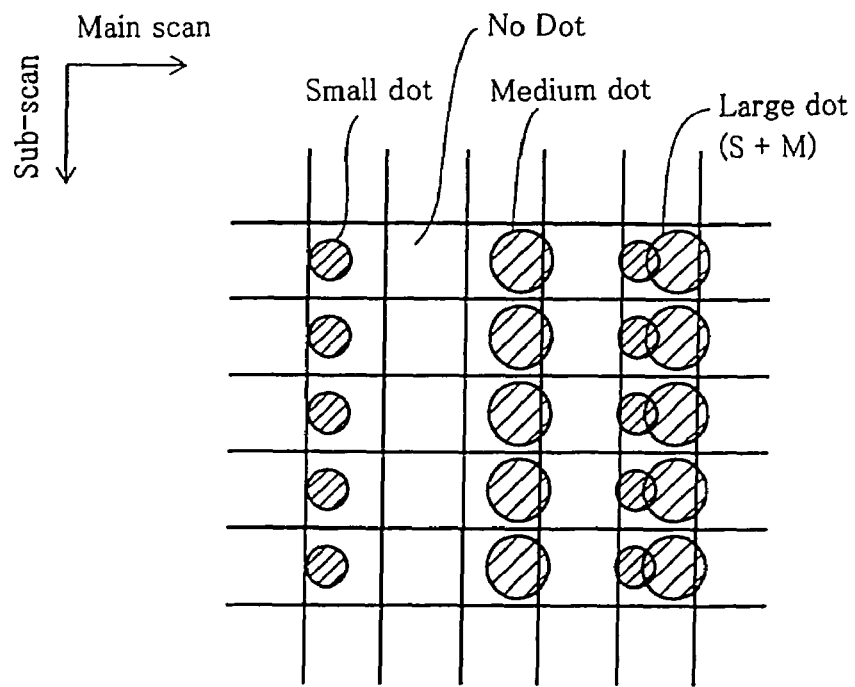
FIG. 13 shows an example of variable dot quantity printing.

FIG. 12 is a common drive signal waveform for variable dot quantity printing, and FIG. 13 is an example of variable dot quantity printing printed using this common drive signal waveform. As shown in FIG. 12, for each pixel period the common drive signal waveform for variable dot quantity printing is divided into a small dot period and a medium dot period. A small dot pulse W1 is produced in the small dot period and a medium dot pulse W2 is produced in the medium dot period. When printing small dots, only small dot pulses W1 are applied to the piezoelectric element, and when printing medium dots, only medium dot pulses W2 are applied to the piezoelectric element. Applying both W1 and W2 pulses to the piezoelectric element results in the printing of large dots (see FIG. 13).

The drive voltage V1 of the common drive signal waveform for fixed dot quantity printing shown in FIG. 10 is determined based on the first drive voltage information VH1. Similarly, the drive voltages V2 and V3 of the common drive signal waveform for variable dot quantity printing shown in FIG. 12 are determined based on the second and third drive voltage information VH2 and VH3. FIG. 9(*b*) shows the relationship between the drive voltage information symbols VH1–VH3 and the voltage values. In the example of FIG. 9(*a*), a symbol S is assigned to the first drive voltage information VH1, so the drive voltage V1 of FIG. 10 is set at 24 volts (how the voltage is set is explained later).

Figures 9A, 9B, 9C, 9D, 9E:
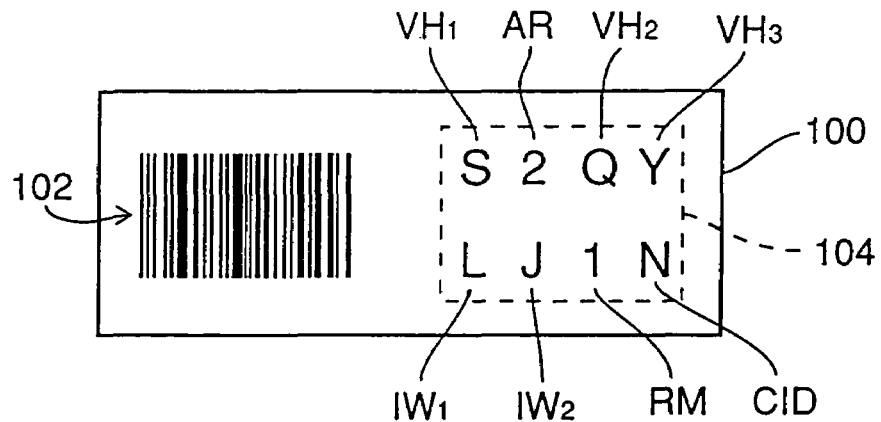
FIGS. 9($a$)–9($e$) show the contents of the head identification information displayed on a head ID seal 100.

The values of the width L1 of the waveform high voltage level shown in FIGS. 10 and 12 and of the width L2 of the waveform zero level shown in FIG. 12 are determined in accordance with the actuator rank information AR. FIG. 9(c) shows that a rank of the actuator (that is, the actuator circuit 90 and piezoelectric element) is specified by the actuator rank information AR. The actuator rank is set beforehand by checking the actual characteristics of the actuator (actuator circuit 90 and piezoelectric element). A detailed explanation of the relationship between actuator rank and waveform width L1 and L2 is omitted.

The ink emission amount information IW1 and IW2 of FIG. 9(d) shows the weight ratio (the proportion taking the average as 100%) between the amounts of ink (for fixed dot quantity) emitted by the second and third actuator chips 92 and 93 (that is, the actuator chips used for color printing). Variations arising during the manufacturing process result in a slight variations in ink emission amount from actuator to actuator. In order to effect good quality printing, is it desirable to be able to control accurately the ink amounts emitted by each actuator. In this embodiment, information about the ink emission amount of each of the actuators used for color printing is supplied to the print driver (not shown) in the computer 88, and the actuator-based variations in ink emission amount are taken into account in the image processing that takes place in the printer driver. Specifically, when relatively small amounts of ink are emitted, the dot printing density (the number of dots printed in a fixed area) is increased. Conversely, when relatively large amounts of ink are emitted, the dot printing density is decreased. Ink emission amount information may be set with respect to all of the actuators on the print head unit 60.

The printing mode information RM of FIG. 9(e) is information specifying the preferable printing mode to be applied to the print head unit 60. Dot printing mode information, including dot printing mode parameters, is stored in the PROM 43 shown in FIG. 3.

Figures 14A, 14B:
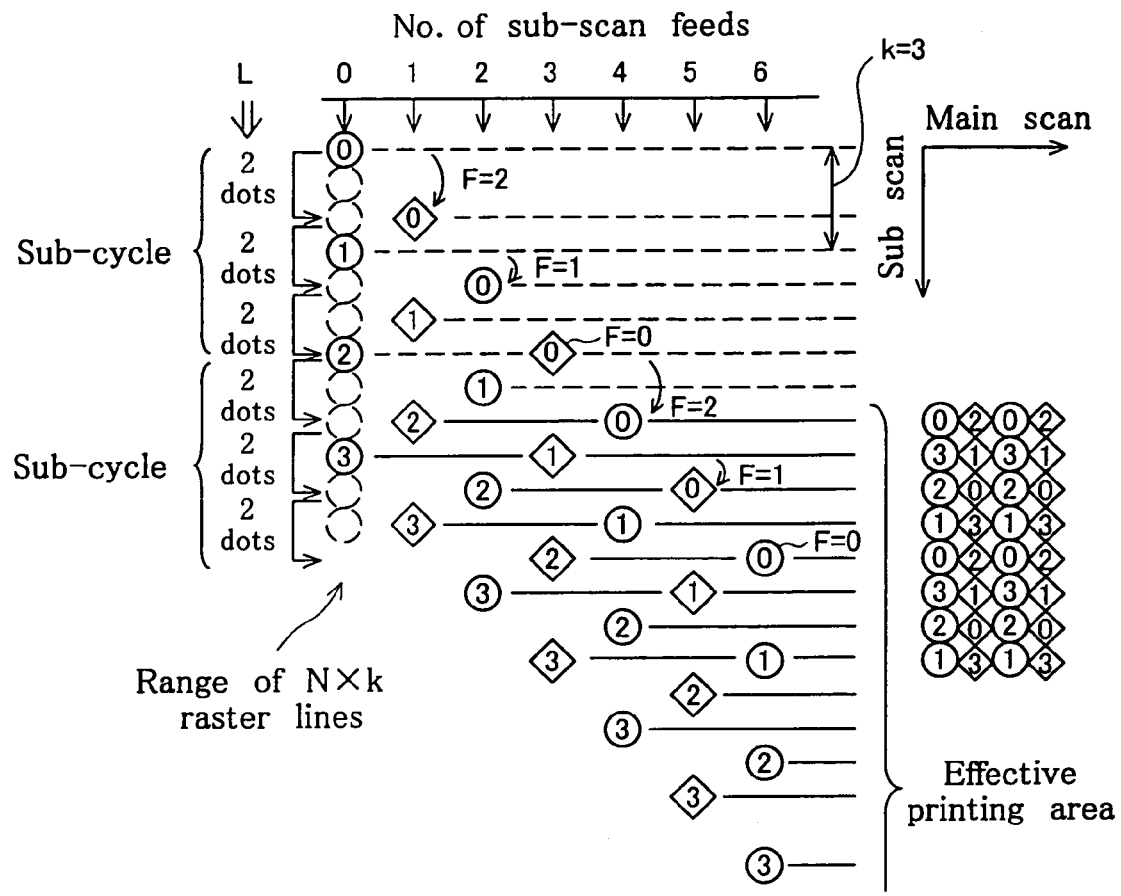
FIGS. 14(A) and 14(B) illustrate parameters prescribing the dot printing mode.

FIGS. 14(A) and 14(B) shows the parameters that define a dot printing mode. FIG. 14(A) is an example of sub-scanning feeds using four nozzles, and FIG. 14(B) shows the parameters for that dot printing mode. In FIG. 14(A) the solid circles containing numbers show the positions of the four nozzles after the nozzles have been fed in the sub-scanning direction. The circled numbers 0–3 are the numbers of the nozzles. The positions of the nozzles are moved in the sub-scanning direction after completion of each main scanning pass. This movement of the nozzles in the sub-scanning direction is a relative movement that is actually realized by using the feed motor 22 to move the paper.

As shown at the left in FIG. 14(A), in this example the sub-scanning feed amount L is a fixed value of two dots. That means that each time sub-scanning feed is effected, the four nozzles are each moved in the sub-scanning direction by the amount of two dots. FIG. 14(B) shows the parameters relating to this dot printing mode. These parameters include nozzle pitch k, in dots, the number of working nozzles N, the number of scan repeats s, the number of effective nozzles Neff, and the sub-scanning feed amount L, in dots.

In the example of FIGS. 14(A) and 14(B), the nozzle pitch k is 3 dots and the number of working nozzles N is 4. The number of working nozzles means, out of the total number of nozzles, the number that is actually used. The number of scan repeats s means that dots are formed at every s dot positions in one main scanning pass. Therefore, the number of scan repeats s is equal to the number of nozzles used to form all of the dots along each raster line. In the example of FIG. 14, the number of scan repeats s is 2. A dot printing mode having the scan repeats s of two or more is called "overlap printing."

The number of effective nozzles Neff is given by dividing the number of working nozzles N by the number of scan repeats s. The number Neff can be thought of as indicating the net number of raster lines that can be printed with one main scanning pass.

The table of FIG. 14(B) lists the sub-scanning feed amount L, cumulative feed amount ΣL and offset F for each sub-scanning feed. Assuming that the periodical positions of the nozzles (located every four dots, in the case of FIG. 14(A)) prior to their first sub-scan feed are reference positions of offset zero, offset F indicates how many dot positions the nozzles are away from the reference positions in the sub-scanning direction after the sub-scanning feed. As shown in FIG. 14(A), for example, the first sub-scanning feed moves the nozzles in the sub-scanning direction by a sub-scanning feed amount L (two dots). The nozzle pitch k is three dots, so after the first sub-scanning feed the nozzle offset F is 2. After the second sub-scanning feed the nozzles have been moved ΣL=4 dots from their initial positions, and the offset F is 1. After the third sub-scanning feed the nozzles have been moved ΣL=6 dots from their initial positions and the offset F is zero. The third sub-scanning feed returns the nozzle offset F to zero, so with three sub-scanning passes comprising one sub-cycle, the dots of all the raster lines in the printable area can be formed by repeating this sub-cycle.

FIGS. 15(A)–15(D) show the scanning parameters of four dot printing modes that have substantially the same printing speed. In the case of the first dot printing mode, in FIG. 15(A), the nozzle pitch k is 6 dots, the number of working nozzles N is 48, the number of scan repeats s is 2 and the number of effective nozzles Neff is 24. Six different values of 20, 27, 22, 28, 21, and 26 are used as the sub-scanning feed amounts L [dots]. The parameters of the second dot printing mode of FIG. 15(B) are the same as those of the first mode, except for the sub-scanning feed amounts L.

The parameters of the third dot printing mode, in FIG. 15(C), are as follows. The nozzle pitch k is 6 dots, the number of working nozzles N is 47, the number of scan repeats s is 2 and the number of effective nozzles Neff is 23.5. Two values of 21 and 26 are used as the sub-scanning feed amounts L. The parameters of the fourth dot printing mode of FIG. 15(D) are the same as those of the third mode, except for the sub-scanning feed amounts L.

The number of working nozzles N in the case of each of the first two modes is not the same as the number of working nozzles N used in each of the third and fourth modes, the number being 48 in the first two modes and 47 in the third and fourth modes. However, the numerical difference is less than about 10%, so the printing speeds are virtually the same. The parameters for such a plurality of dot printing modes having substantially the same printing resolutions and the same printing speeds, can be registered beforehand in the printer PROM 43 as a plurality of selectable dot printing mode information.

In the case of the example shown in FIG. 9(e), the printing mode information RM specifies one mode as a high quality printing mode and another as a high speed printing mode. In the high quality mode high quality images are printed at a relatively slow speed, while in the high speed mode, the image quality is lower but the images can be printed at a higher speed. For the high quality printing mode, there has been prepared a plurality of dot printing modes for printing at the same resolution at speeds that are substantially the same, and, similarly, for the high speed printing mode there has also been prepared a plurality of dot printing modes for printing at the same resolution at speeds that are, again, substantially the same. "Printing at substantially the same speeds" means a printing speed differential of up to about 10%.

When a plurality of dot printing modes are available at the same resolution and at substantially the same speed, the quality of the images printed in each dot printing mode depends on the alignment characteristics of the nozzles (that is, the actual positions of each nozzle) in the print head unit 60. For example, even if the four dot printing modes shown in FIGS. 15(A)–15(D) are available as high quality printing modes, there are cases in which a higher quality can be obtained in one of the modes than in the others. Accordingly, by determining the preferable dot printing mode that attains a better print image quality, in accordance with the nozzle alignment characteristics, and displaying this on the print head unit 60 as printing mode information RM, it is possible to produce good quality printing by using a preferred dot printing mode for the printer 20.

Figure 16:
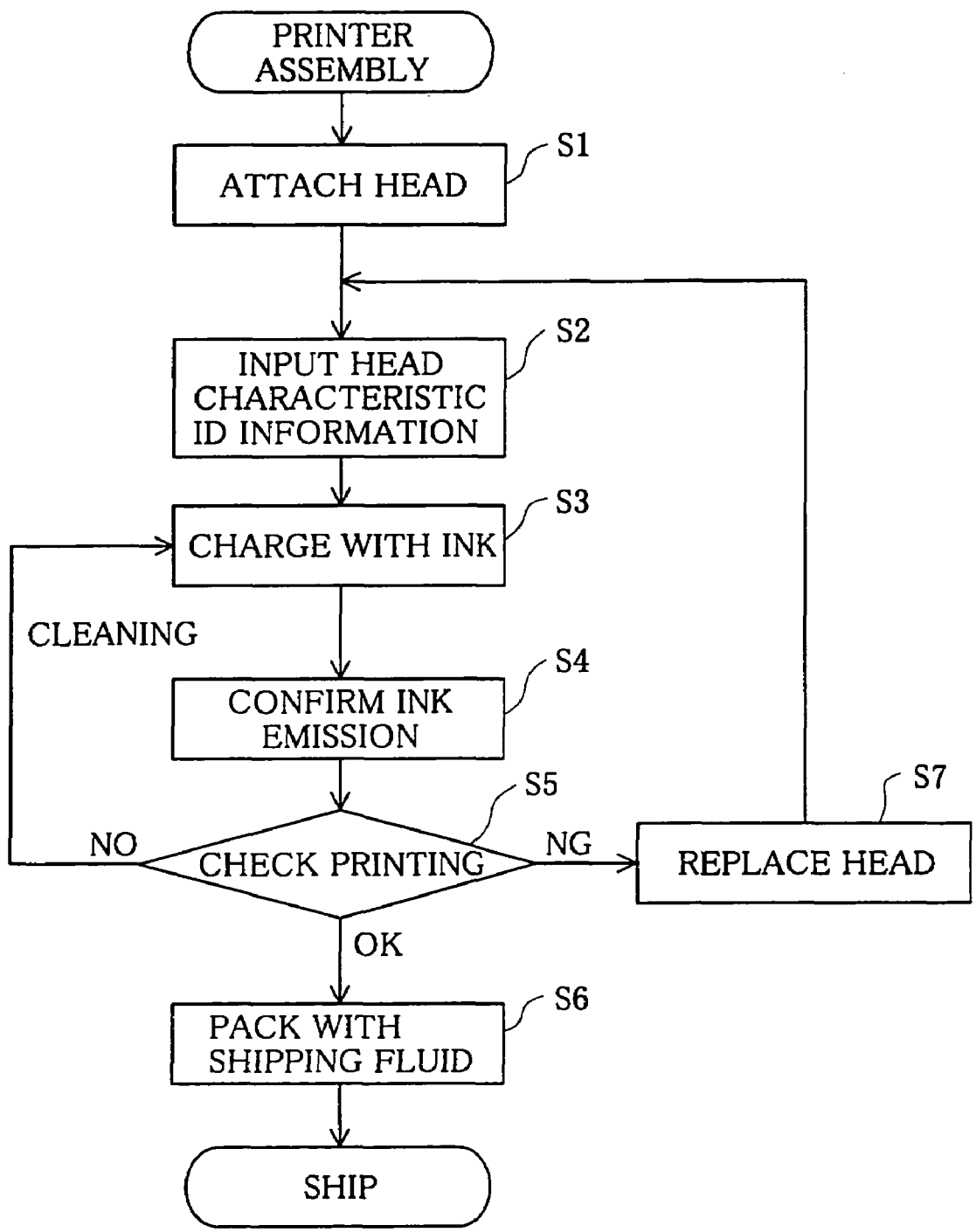
FIG. 16 is a flow chart of the steps of installing print head unit 60 on the printer 20.

FIG. 16 is a flow chart of the steps of installing the print head unit 60 on the printer 20. In step S1 the print head unit 60 is mounted on the printer 20, and in step S2 the head identification information is input. When a head ID seal 100 is adhered to the print head unit 60, as shown in FIG. 4, there are a number of ways the head identification information can be input. As a first method, an operator can key in the head identification information via the keyboard (not shown) of the computer 300. In the case of this method, the mode selection information writing module 310 (FIG. 1) writes the head identification information into the PROM 43. A second method comprises using a barcode reader to read the barcode 102. As shown in FIG. 2, the printer 20 is provided with a barcode reader 110 for optically reading the head ID seal 100. The barcode reader 110 can read the barcode 102 on the head ID seal 100 automatically when the print head unit 60 is moved in the main scanning direction. The printer 20 does not have to be equipped with a barcode reader 110; instead, a separate barcode reader may be used. Also, instead of a barcode, other types of codes can be used that can be read physically (i.e., optically, magnetically or electrically) and mechanically.

The head identification information thus input is stored in the PROM 43. Also, the first and second ink emission amount information IW1 and IW2 and the printing mode information RM are registered in the printer driver 306. The PROM 43 is provided on a printed circuit board in the printer 20 and therefore remains in the printer, irrespective of the presence or absence of the print head unit 60. As such, when a print head unit 60 is replaced, the head identification information registered in the PROM 43 is replaced by the head identification information of the new print head unit 60.

In step S3, the ink cartridges are installed in the print head unit 60, charging the print head 28 with ink. In step S4, ink is emitted by the nozzle array to print a prescribed test pattern. This pattern reflects the characteristics of the print head unit 60 being used. More specifically, the drive signal waveform (FIG. 10 or 12) generated by the head drive circuit 52 is adjusted on the basis of the drive voltage information VH1–VH3 and the actuator rank information AR. To ensure that the tone levels of the image data are reproduced properly, dot printing densities for each ink are determined by the printer driver based on the ink emission amount information IW1 and IW2. The dot printing mode that is actually used is determined by the printing mode information RM, and the processing of the image data in the printer driver, and the main and sub-scanning in the printer 20, are controlled to ensure that printing proceeds in accordance with the dot printing mode thus set.

Some of the parameters including the drive signal waveform parameters V1–V3 and L1–L2, the ink emission amounts and the preferable dot printing mode have an affect on the printing outcome, and so are referred to as "printing process parameters." As can be understood from this explanation, the control circuit 40 and printer driver 306 function as a control section implementing printing processing in accordance with the printing process parameters specified by the head identification information. These functions of the control section can be divided between the control circuitry in the printer 20 and the computer 300 connected to the printer 20. Depending on the printing process parameters concerned, it may also be possible for the functions of the control section to be implemented entirely within the printer 20 or entirely within the computer 300.

In step S5, the test pattern is examined by an inspector. If the test pattern does not meet a prescribed standard, the head is cleaned and steps S3 and S4 are repeated. If the head cleaning operation has been run a prescribed number of times but the test pattern still does not meet the required standard, in step S7 the print head unit 60 is replaced and steps S2 to S5 are repeated. The new print head unit 60 also has a head ID seal 100, making it easy to set proper printing process parameters for that print head unit. After passing the printing quality inspection, the print head 28 is filled with fluid for shipping of the printer 20, completing the installation of the print head unit 60.

In the first embodiment described in the foregoing, head identification information is assigned to each print head unit 60 corresponding to the variations in the characteristics of the print head unit 60 arising in the course of the manufacturing process, with the head identification information being displayed in a readable form. This makes it easy for the various printing process parameters, such as drive signal waveform and dot printing mode, for example, to be set in accordance with the head characteristics of the print head unit 60 installed in the printer. In particular, dot printing mode information that includes plural sets of dot printing mode parameters are stored beforehand in a PROM 43 on a circuit board in the printer 20, and the printing mode information RM displayed on the print head unit 60 facilitates the setting of the preferable dot printing mode that best suits the characteristics of the print head unit 60. This is particularly advantageous when a user replaces the print head unit 60, since it allows good quality printing to be attained with the new print head unit simply by setting the head identification information in the printer driver and the PROM 43.

Figure 17:
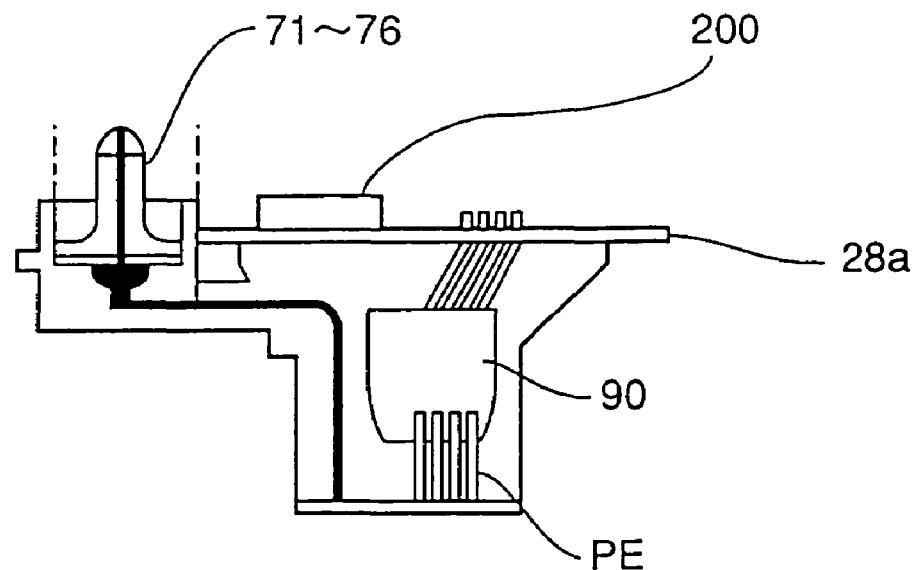
FIG. 17 shows a print head 28$a$ of a print head unit in a second embodiment of the invention.

C. Second Embodiment:

FIG. 17 is a diagram of the print head 28a of a print head unit according to a second embodiment of the invention. The print head 28a has a programmable ROM (PROM) 200 in which is stored the head identification information of FIGS. 9(a)–9(e). The PROM 200 is provided on the print head unit and is therefore replaced when the print head unit itself is replaced. The head identification information stored in the PROM 200 is read out for use by the control circuit 40 in the printer 20 and the printer driver 306 in the computer 300.

Figure 18:
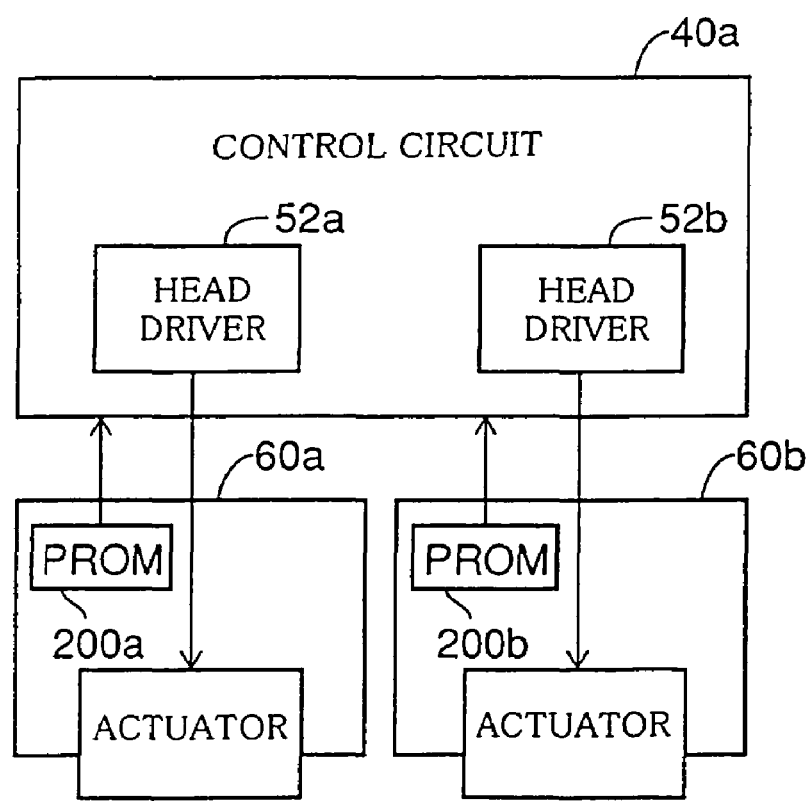
FIG. 18 shows an example of the relationship between print head units and control circuit in a printer equipped with multiple print head units.

Some types of printers may be equipped with multiple print head units. FIG. 18 shows an example of the relationship between the print head units and the control circuit in a printer equipped with multiple print head units. The example shown in FIG. 18 has a first print head unit 60a for monochrome printing and a second print head unit 60b for color printing. Each of the print head units 60a and 60b can be installed and removed independently. The print head units 60a and 60b are provided with a PROM 200a and a PROM 200b for storing the print head identification information of each print head unit. Control circuit 40a has head drive circuits 52a and 52b for supplying respective drive signals to the print head units 60a and 60b. Instead of using the PROMs 200a and 200b, the type of head ID seal shown in FIG. 9(a) can be adhered to each print head unit.

With such a configuration where a single printer can be equipped with multiple print head units, if head identification information is set for each print head unit, even if any of the print head units is replaced, it is still possible to achieve good quality printing based on the characteristics of the print head unit concerned.

A configuration that can be equipped with multiple print head units can still be arranged so that a common drive signal is supplied to the multiple print head units from a single drive circuit. With such an arrangement, as in the first embodiment, some of the printing process parameters that do not effect the drive signal waveform (a preferable dot printing mode and dot printing density corresponding to ink emission amount) can be determined according to the characteristics of each print head unit. However, an arrangement such as that of FIG. 18 in which a plurality of head drive circuits is provided corresponding to the plurality of print head units is advantageous in that drive signals each having a preferred waveform for a particular print head unit can be supplied to the print head unit concerned.

When there is provided a PROM 200 for each print head unit, an arrangement can be used whereby the control circuit 40 (FIG. 3) can also be used to write the service history of each print head unit to the PROM 200. For example, a counter could be provided in the control circuit 40 to count the number of ink emissions from a print head unit, and the count value may be stored in the PROM 200 of the print head unit. With such an arrangement, even if a print head unit is removed in mid-service, the number of times the print head unit had been used could be retrieved from the PROM 200, making it possible to judge the working life of the print head unit. Other service history items that can be used include the number of ink emissions for each actuator or for each ink.

Figure 19:
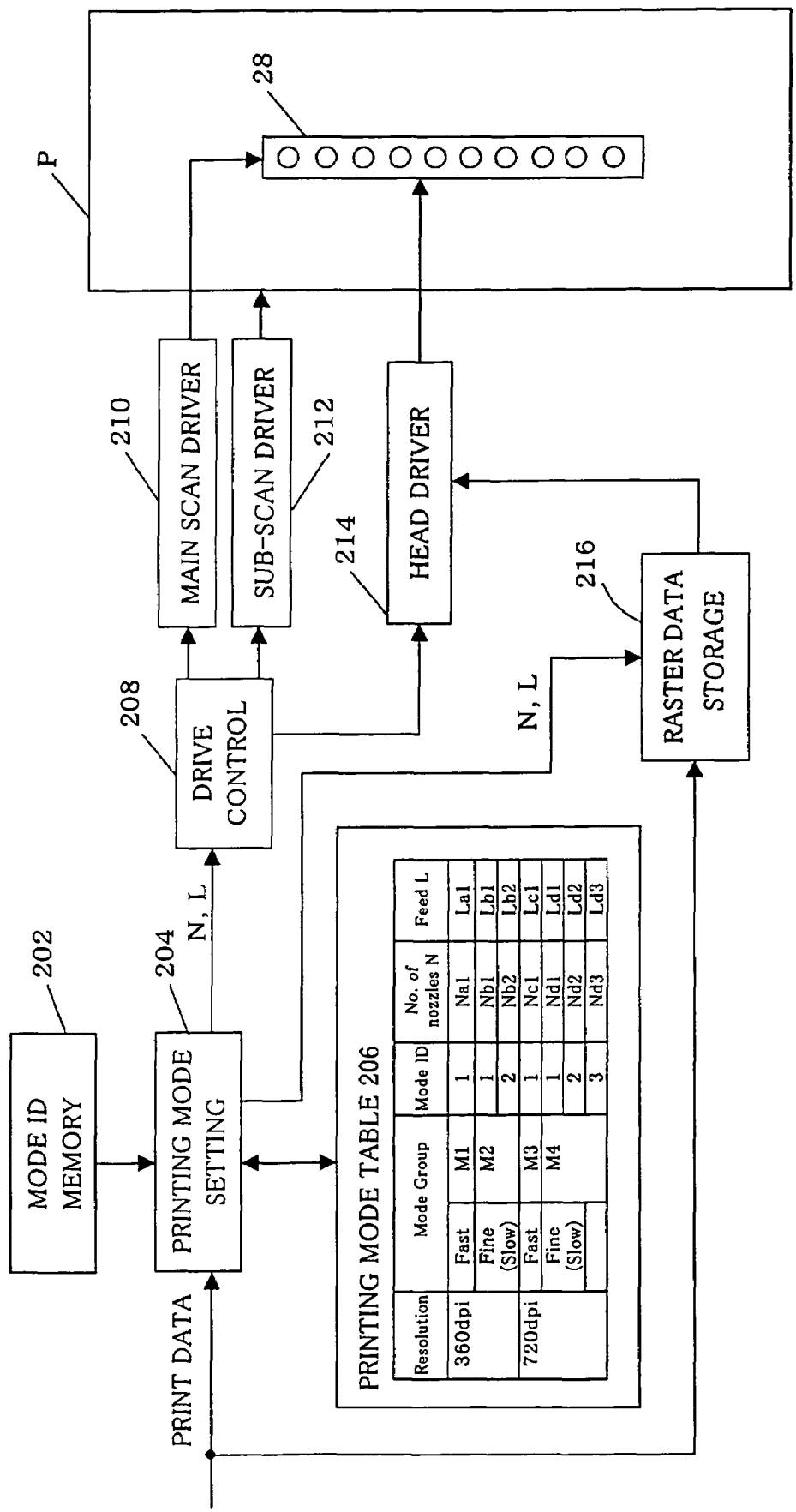
FIG. 19 is a function block diagram of the arrangement used to effect drive control for each dot printing mode, in a third embodiment.

D. Third Embodiment:

FIG. 19 is a function block diagram of a configuration used to effect drive control for each dot printing mode, in accordance with a third embodiment of the invention. The block diagram shows a mode ID memory 202, printing mode setting section 204, printing mode table 206, drive control section 208, main scanning drive section 210, sub-scanning drive section 212, print head drive section 214, raster data storage section 216, print head 28 and paper P.

A plurality of dot printing mode information is stored in the printing mode table 206. The printing mode table 206 shows the printing resolution, mode group, mode ID, the number of working nozzles N and the sub-scanning feed amount L. There are more parameters, which are not shown in FIG. 19.

In the FIG. 19 configuration, the plurality of dot printing modes stored in the printing mode table 206 are divided into four mode groups M1–M4, by combination of printing resolution and printing speed. The first mode group M1 is a "fast at 360 dpi" group; the second mode group M2 is a "fine (and slow) at 360 dpi" group; the third mode group M3 is a "fast at 720 dpi" group, and the fourth mode group M4 is a "fine (and slow) at 720 dpi" group. The contents of the printing mode table 206 are described in further detail later.

The mode ID memory 202 contains the mode IDs (mode selection information) specifying the preferable dot printing mode for each mode group. Based on printing data received from the computer 300 and a mode ID received from the mode ID memory 202, the printing mode setting section 204 supplies to the drive control section 208 and raster data storage section 216 parameters defining the main and sub-scanning operations. The printing data is the same as the final color image data FNL of FIG. 1. The header of the printing data (not shown) includes data selecting one of the mode groups M1 to M4. The printing mode setting section 204 uses this mode group and the mode ID supplied from the mode ID memory 202 to determine the dot printing mode to be used in the printing.

Scanning parameters for the dot printing mode thus determined, including the number of working nozzles N and the amount L of sub-scanning feed, are sent to the drive control section 208 and the raster data storage section 216 by the printing mode setting section 204. Because the number of working nozzles N and the sub-scanning feed amount L may change each scanning pass, the scanning parameters including these data are sent to sections 208 and 216 prior to each scanning pass.

The raster data storage section 216 stores the printing data in a buffer memory (not shown) according to the scanning parameters including the number of working nozzles N and the sub-scanning feed amount L. The drive control section 208 controls the main scanning drive section 210, sub-scanning drive section 212 and print head drive section 214 in accordance with the scanning parameters including the number of working nozzles N and the sub-scanning feed amount L.

The mode ID memory 202 and printing mode table 206 are provided in the PROM 43 shown in FIG. 3. The functions of the printing mode setting section 204, drive control section 208 and raster data storage section 216 are manifested by means of the CPU 41, RAM 44 and head drive circuit 52 of the control circuit 40 of FIG. 2. The main scanning drive section 210 is constituted by the feed travel mechanism of the carriage 30 with carriage motor 24, shown in FIG. 2, while the sub-scanning drive section 212 is constituted by a paper feed mechanism that includes the feed motor 22. The print head drive section 214 is constituted by the head drive circuit 52 of FIG. 3 and the actuator circuit 90 of FIG. 7.

FIG. 20 shows scanning parameters for three dot printing modes at substantially the same printing speed. The three dot printing modes are ones included in the fourth mode group M4. With respect to parameters, in the first dot printing mode, in FIG. 20(A), the nozzle pitch k is 6 dots, the number of working nozzles N is 48, the number of scan repeats s is 2 and the number of effective nozzles Neff is 24. Six different values of 20, 27, 22, 28, 21, and 26 are used as the sub-scanning feed amounts L [dots]. The parameters of the second dot printing mode of FIG. 20(B) are the same as those of the first mode, except for the sub-scanning feed amounts L. With respect to the parameters of the third dot printing mode, in FIG. 20(C), the nozzle pitch k is 6 dots, the number of working nozzles N is 47, the number of scan repeats s is 2 and the number of effective nozzles Neff is 23.5. Two values of: 21 and 26 are used as the sub-scanning feed amounts L [dots].

While the first two modes use 48 working nozzles compared to 47 in the third mode, the difference in the number of working nozzles is less than about 10% across the three modes. Since the printing speed is substantially proportional to the number of effective nozzles Neff (=N/s), the printing speeds of the three modes of FIG. 20 can be regarded as substantially the same. Here, "printing at substantially the same speeds" means a printing speed difference of up to about 10%.

FIGS. 21(A) and 21(B) show the contents of the printing mode table 206 and mode ID memory 202. The multiple dot printing modes contained in the printing mode table 206 are divided into the four mode groups M1–M4. Mode groups M1 and M3 each contains one printing mode, group M2 contains two printing modes, and group M4 contains three printing modes. Within one mode group, printing speeds (that is, the number of effective nozzles N/s) are substantially the same. For example, the number of effective nozzles Nd1/s, Nd2/s, Nd3/s of the three modes in the mode group M4 are substantially the same. In the examples of FIGS. 20(A)–20(C), Nd1/s=Nd2/s=24, Nd3/s=23.5.

The "fine" mode groups M2 and M4 are comprised of overlapping type dot printing modes with the number of scan repeats s of 2. In the case of the "fast" mode groups M1 and M3 the number of scan repeats s is 1. The number of scan repeats s may take a value including a fraction. A dot printing mode in which the number of scans is larger than 1 and smaller than 2 is termed a "partial overlap system." A partial overlap dot printing monde can be used in the "fast" mode groups M1 and M3. Assuming, for example, that the number of working nozzles N is 48 and the sub-scanning feed amount is set at a constant 41 dots, the result would be a partial overlap mode with the number of effective nozzles Neff of 41 and the number of scan repeats s of about 1.17 (i.e., 48/41). In the case also of a partial overlap mode, sub-scanning feed amount L can be comprised of a plurality of different values.

While each mode group is constituted of the dot printing modes having the same resolution and substantially the same speed, the image quality of the print depends on the alignment characteristics of the nozzles in the print head 28 (that is, the actual positions of the nozzles). Thus, in some cases one of the dot printing modes of the mode group M4 may produce a higher quality than the other two modes. Therefore, if a preferable printing mode is determined for each mode group to provide a higher image quality in accordance with the nozzle alignment characteristics and the preferred mode ID is registered in the mode ID memory 202, it is possible to attain better quality printing by utilizing the preferable dot printing mode for the printer 20.

As can be readily understood from FIG. 21(A), in accordance with the third embodiment, for each printing resolution, the larger number of dot printing modes are prepared as the printing speed decreases. Normally, at relatively slow printing speeds there tends to be a larger image quality difference between dot printing modes. In this embodiment, when the printing speed is relatively low, a preferable dot print mode can be selected from a larger number of modes having the same printing resolution, and it is therefore easier to improve the image quality. Conversely, at higher printing speeds the quality difference between modes is not so large, so it is sufficient to prepare a smaller number of printing modes. Although in the example of FIG. 21(A) the "fast" mode groups M1 and M3 are each comprised of one printing mode, they may instead each be comprised of multiple printing modes.

The mode ID memory 202 stores four mode IDs for selection a preferable dot printing mode in each of the four mode groups M1–M4. A preferable dot printing mode can be set independently for each of the mode groups. For each printer, this facilitates the setting of a preferable dot printing mode for each mode group (that is, for each combination of printing resolution and speed). This effect is particularly noticeable when each mode group contains a multiplicity of printing modes.

In the third embodiment described above, the number of available dot printing modes increases as the printing speed decreases, with respect to each resolution of 360 dpi and 720 dpi. However, in the present invention, it is sufficient to prepare the larger number of available dot printing modes as the printing speed decreases with respect to at least one printing resolution, and other mode groups having other printing resolutions may include an identical number of dot printing modes from each other.

In the above explanation it was assumed that the printing resolution was the same in the main- and sub-scanning directions. However, some printers are able to use printing modes in which the resolution in the main-scanning direction is different from that in the sub-scanning directions. Printing modes are categorized into those having the same combination of resolutions in the main and sub-scanning direction, and those having different resolutions. If two printing modes have the same values for both of the resolutions in the main- and sub-scanning directions, it is said that "they have the same resolutions." If, on the other hand, the two printing modes are different in at least one of the resolutions in the main and sub-scanning directions, it is said that "they have different resolutions." For example, a printing mode in which the resolution is 720 dpi in the main scanning direction and 360 dpi in the sub-scanning direction will be placed in a different mode group to a printing mode in which the resolution is 720 dpi in both the main- and sub-scanning directions.

As shown in FIGS. 21(A) and 21(B), the mode group M1 is selected by the initial settings of the printing conditions. Unless the user changes the printing conditions, therefore, the printer will print in accordance with the "fast" 360 dpi setting of mode group M1. This initial setting is suited for this printer when the main requirement is fast printing. When the main requirement for this printer is higher image quality, the 720 dpi "fine" mode group M4 is the suitable initial mode setting. As will be understood, the mode group selected for the initial settings is determined not on an individual printer by printer basis, but by printer model. On the other hand, as described above, it is preferable that the mode ID indicating the preferable printing mode in each mode group is decided on an individual printer by printer basis.

FIG. 22 illustrates the selected mode group for each type of printing paper according to the initial settings of the printing conditions. Herein, "type of printing paper" means the type of surface quality of the paper. The mode groups, mode IDs, number of working nozzles N, and sub-scan feed amounts L are the same as those of FIG. 21(A). With respect to FIG. 22, there are initial settings registered for three types of printing paper, which are plain paper, superfine paper and photo-print paper. The "fast" 360 dpi setting of mode group M1 is selected for plain paper, and the 720 dpi "fine" mode group M4 is selected for superfine paper and photo-print paper. The general initial printer settings are for plain paper.

Figure 23:
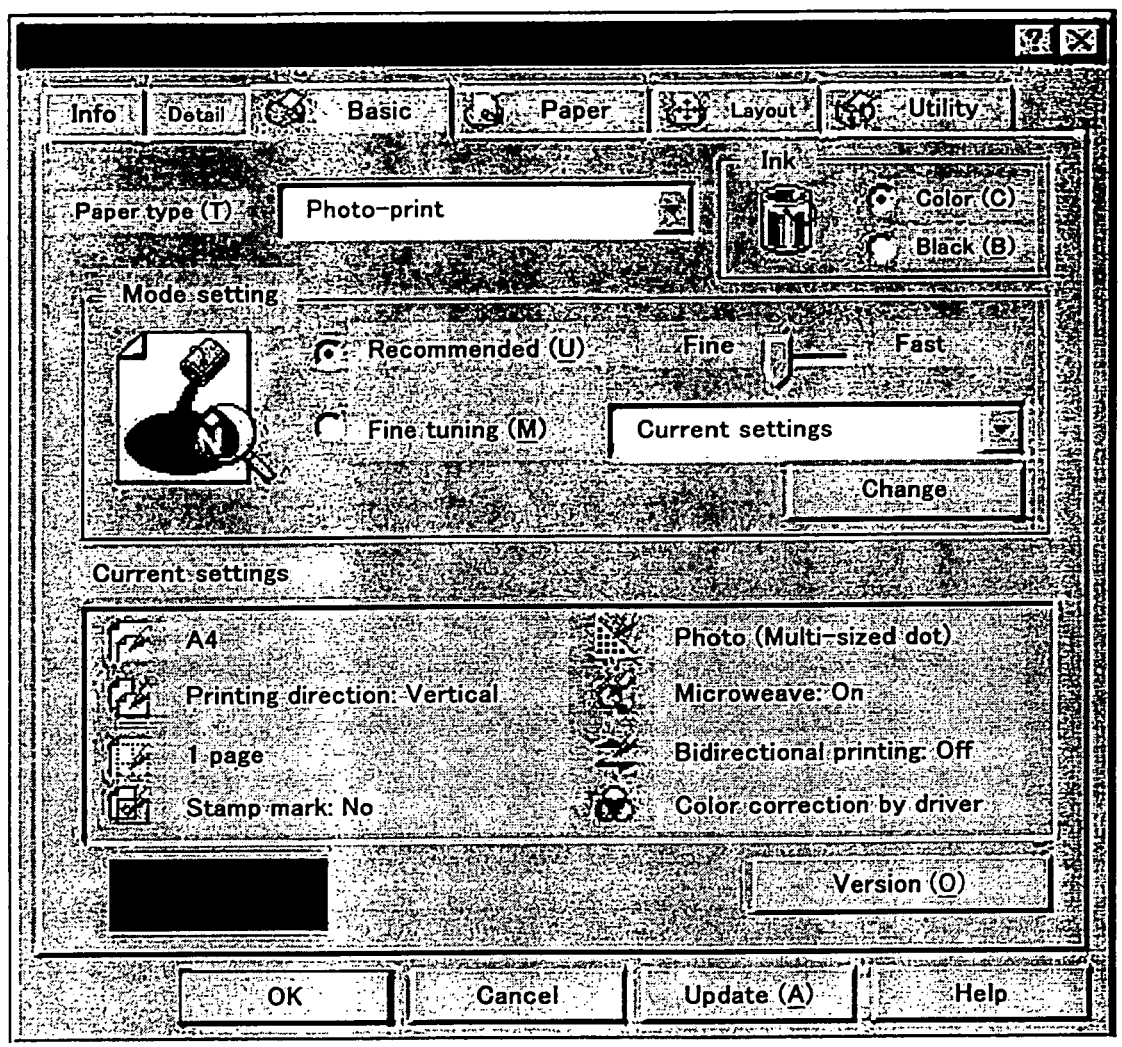
FIG. 23 shows a dialog box used to set the initial printing conditions with respect to photo-print paper.

FIG. 23 shows a dialog box used to set the initial printing conditions with respect to photo-print paper. That is, these are the recommended settings (initial settings) that are displayed when a user specifies the photo-print paper selection. As shown, the initial settings recommended for photo-print paper are selected from a "fine" mode group. This dialog box does not display the details of the printing resolution conditions, but the mode group selected is the 720 dpi "fine" mode group M4 (FIG. 22). In the initial printer settings, plain paper is selected in the dialog box of FIG. 23, and the recommended (initial) mode group setting is a "fast" mode.

Printing conditions can be changed as desired by clicking on the "Fine tuning" button shown in the middle of the dialog box of FIG. 23. For example, although in the example of FIG. 22 the 360 dpi "fine" mode group M2 is not selected as an initial setting for any paper, a user can select mode group M2. However, the user can only select one of the four mode groups M1–M4. With respect to mode groups M2 and M4 that include a plurality of printing modes, a user cannot select a printing mode other than a printing mode specified by the mode ID. This makes it possible to prevent the user making a mistake by selecting an undesirable printing mode.

The selection of the preferred mode group by the initial settings for each type of paper makes it possible to effect printing using the preferable printing mode for each type of paper in the initial settings state.

E. Variations:

E1. First Variation:

The PROM 43 in the control circuit 40 of the printer 20 (FIG. 2) and the PROM 200 (FIG. 16) mounted on the print head unit may be constituted by non-volatile memory instead of programmable ROM.

E2. Second Variation:

The head identification information items depicted with reference to each of the above embodiments are only examples. Various other head identification information items determined beforehand in relation to print head unit characteristics that are subject to variations in the manufacturing process may be assigned to the print head unit.

E3. Third Variation:

The information items included in the head identification information may be aimed at various targets. For example, when a print head unit is provided with a plurality of actuators, the head identification information may be arranged to include information for setting multiple sets of printing process parameters for the actuators. Also, the head identification information may include information for setting multiple sets of printing process parameters for multiple sets of nozzle arrays. Moreover, the head identification information may include information for setting multiple sets of printing process parameters for multiple sets of nozzle rows. This would enable the setting of printing process parameters adapted for each such target, resulting in high quality printing.

E4. Fourth Embodiment:

In the above embodiments the dot printing modes have been described with reference to one color. Color printing with a plurality of ink can be implemented by applying the above dot printing mode to a plurality of colors.

E5. Fifth Embodiment:

This invention is also applicable to monochrome printing. It is also applicable to printing in which multiple tones are reproduced by using a plurality of dots to reproduce one pixel. It is also applicable to drum-scanning printers, in which case the main scanning direction would be the direction of drum rotation and the sub-scanning direction would be the direction of carriage travel. The invention is applicable not only to inkjet printers but to all dot printing apparatuses that use a print head having an array of multiple dot formation elements to print on a printing medium. Here, "dot formation elements" refers to elements used to form dots such as the ink nozzles of an inkjet printer.

E6. Sixth Embodiment:

While the configurations of the above embodiments have been described in terms of hardware, the configurations may be partially replaced by software. Conversely, software-based configurations may be partially replaced by hardware. For example, some of the functions of the control circuit 40 (FIG. 2) may be implemented by the computer 300. In such a case, a computer program such as the printer driver 306 or the like would effect the same functions as the control functions of the control circuit 40.

Computer programs for realizing such functions may be provided stored on a storage medium that can be read by computer such as floppy disks and CD-ROM disks. The computer system 300 can transfer the program from the storage medium to an internal or external storage device. Alternatively, the programs may be supplied to the computer system 300 by a program provider apparatus via a communication path. The computer program functions are realized by the stored program being executed by the microprocessor of the computer 300. The computer program on the storage media may also be executed directly by the computer system 300.

The computer system 300 as referred to herein is taken to include hardware and operating system, with the hardware functioning under the control of the operating system. Some of the above functions may be implemented by the operating system instead of by an application program.

The computer readable storage media are not limited to portable storage media such as floppy disks and CD-ROM disks, but also include internal storage and memory devices such as various types of RAM and ROM as well as external fixed storage such as hard disks.

INDUSTRIAL APPLICABILITY

This invention can be applied to inkjet printers, inkjet facsimile machines, inkjet copy machines and various other type of apparatuses in which a print head is used in printing.

What is claimed is:

1. A printing apparatus that prints images by forming dots on a print medium, comprising:

print head including a plurality of dot formation means for forming dots on the print medium;

a main scanning means for moving one of the print head and the print medium for main scanning;

a head drive means for driving at least a portion of the plurality of dot formation means so as to form dots on the print medium during main scanning;

a sub-scanning means for moving one of the print head and the print medium for sub-scanning at completion of each main scan; and a control means for controlling printing;

wherein the control means includes:

printing mode storage means for storing a plurality of dot printing modes each defining printing operations during the main scanning and sub-scanning, wherein the plurality of dot printing modes are divided into a plurality of printing mode groups having one or more members, with each member of each printing mode group providing similar print resolution and relative printing speed, the plurality of printing mode groups being formed into at least a first printing mode group set for a first print resolution and a second printing mode group set for a second print resolution, each of the first and second printing mode group sets including two or more of the printing mode groups with the printing mode groups included in each of the first and second printing mode group sets being arranged so that the number of dot printing modes included in a group increases as its printing speed decreases;

mode selection information setting means for setting mode selection information specifying one preferable dot printing mode for each printing mode group from among the one or more members of that printing mode group;

means for executing printing according to the preferable dot printing mode specified in the mode selection information; and initial setting registration means for registering initial settings of the printing apparatus including selection of only one of the plurality of printing mode groups.

2. The printing apparatus according to claim 1, wherein the initial setting registration means registers an initial setting for each printing mode group as being preferred as to each different type of print medium having a different surface quality, the initial setting relating to the predetermined print medium type is registered as an initial setting of the predetermined print medium type that can be printed on by the printing apparatus.

3. A method of printing images by forming dots on a print medium using a printing apparatus comprising a print head that includes a plurality of dot formation elements for forming dots on the print medium, the method comprising the steps of:

moving one of the print head and the print medium to perform main scanning;

sub-scanning by driving at least a portion of the plurality of dot formation elements so as to form dots on the print medium during the main scanning;

providing a plurality of dot printing modes each defining printing operations during main scanning and sub-scanning, the plurality of dot printing modes being divided into printing mode groups that each have one or more members, with each member of each printing mode group providing similar print resolution and relative printing speed, the plurality of printing mode groups being formed into at least a first printing mode group set for a first print resolution and a second printing mode group set for a second print resolution, each of the first and second printing mode group sets including two or more of the printing mode groups with the printing mode groups included in each of the first and second printing mode group sets being arranged so that the number of dot printing modes included in a group increases as its printing speed decreases; and selecting one preferable dot printing mode from among the one or more members of each printing mode group as the preferred dot printing mode of that printing mode group according to predetermined preferred dot printing mode selection information; and initially selecting only one of the printing mode groups for executing printing relative to each one of different print mediums having a different printing characteristic.

4. The method according to claim 3, wherein the different printing characteristic is a different surface quality and an initial setting relating to a predetermined print medium having a predetermined surface quality is preselected as an initial setting of the printing apparatus.

5. The method according to claim 4, wherein among the plurality of printing mode groups two or more printing mode groups with respect to one print resolution are arranged so that the number of dot printing modes included in a group increases as its printing speed decreases.

6. A printing apparatus that prints images by forming dots on a print medium, comprising:

a print head including a plurality of dot formation elements configured to form dots on the print medium;

a main scanning drive section configured to move one of the print head and the print medium for main scanning;

a head drive section configured to drive at least a portion of the plurality of dot formation elements so as to form dots on the print medium during main scanning;

a sub-scanning drive section configured to move one of the print head and the print medium for sub-scanning at completion of each main scan; and a control section configured to control printing;

wherein the control section includes, a printing mode store configured to store a plurality of dot printing modes each defining printing operations during the main scanning and sub-scanning, wherein the plurality of dot printing modes are divided into a plurality of printing mode groups having one or more members, with each member of each printing mode group providing similar print resolution and relative printing speed, the plurality of printing mode groups being formed into at least a first printing mode group set for a first print resolution and a second printing mode group set for a second print resolution, each of the first and second printing mode group sets including two or more of the printing mode groups with the printing mode groups included in each of the first and second printing mode group sets being arranged so that the number of dot printing modes included in a group increases as its printing speed decreases;

a mode selection information setter configured to set mode selection information specifying one preferable dot printing mode for each printing mode group from among the one or more members of that printing mode group;

a controller responsive to the mode selection information setter and configured to execute a printing operation according to the preferable dot printing mode specified in the mode selection information; and an initial setting registration element configured to register initial settings of the printing apparatus including selection of only one of the plurality of printing mode groups.

7. The printing apparatus according to claim 6, wherein the initial setting registration element registers an initial setting for each printing mode group as preferred as to each different type of print medium having a different surface quality that can be printed on by the printing apparatus.

8. The printing apparatus according to claim 6, wherein among the plurality of printing mode groups two or more printing mode groups with respect to one print resolution are arranged so that the number of dot printing modes included in a group increases as its printing speed decreases.

* * * * *